(12) United States Patent
Takeyama et al.

(10) Patent No.: US 7,169,367 B2
(45) Date of Patent: Jan. 30, 2007

(54) CHEMICAL REACTION APPARATUS AND POWER SUPPLY SYSTEM

(75) Inventors: Keishi Takeyama, Hamura (JP); Yoshihiro Kawamura, Fussa (JP); Osamu Nakamura, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 657 days.

(21) Appl. No.: 10/405,840

(22) Filed: Apr. 2, 2003

(65) Prior Publication Data

US 2003/0190508 A1 Oct. 9, 2003

(30) Foreign Application Priority Data

Apr. 5, 2002 (JP) .............................. 2002-104329
Aug. 21, 2002 (JP) .............................. 2002-240460

(51) Int. Cl.
*B01J 19/00* (2006.01)
*H01M 8/06* (2006.01)

(52) U.S. Cl. ......................... 422/198; 422/199; 429/20

(58) Field of Classification Search .................. 429/20, 429/24; 422/198, 199
See application file for complete search history.

(56) References Cited

U.S. PATENT DOCUMENTS

| | | | | |
|---|---|---|---|---|
| 4,254,086 | A | * | 3/1981 | Sanders .................. 422/199 X |
| 5,746,985 | A | * | 5/1998 | Takahashi ................. 429/20 X |
| 5,961,932 | A | * | 10/1999 | Ghosh et al. ............ 422/199 X |
| 6,635,226 | B1 | * | 10/2003 | Tso et al. ................ 422/199 X |
| 6,946,113 | B2 | * | 9/2005 | Seaba et al. .............. 429/20 X |
| 6,960,235 | B2 | * | 11/2005 | Morse et al. ........... 422/198 X |

FOREIGN PATENT DOCUMENTS

| | | |
|---|---|---|
| JP | 2000-506432 A | 5/2000 |
| JP | 2001-226104 A | 8/2001 |
| JP | 2001-322283 A | 11/2001 |
| JP | 2004-508670 A | 3/2004 |
| WO | WO 02/24322 A2 | 3/2002 |

* cited by examiner

*Primary Examiner*—Stephen J. Kalafut
(74) *Attorney, Agent, or Firm*—Frishauf, Holtz, Goodman & Chick, P.C.

(57) ABSTRACT

A chemical reaction apparatus includes at least one reaction region formed on a solid body and having a continuously formed reaction flow path to which a fluid material is supplied, and a temperature adjusting layer which is provided on the body to correspond to a region including the reaction flow path and portions between adjacent portions of the reaction flow path. The temperature adjusting layer supplies a predetermined heat quantity to the reaction flow path.

48 Claims, 15 Drawing Sheets

CHEMICAL REACTION APPARATUS AND POWER SUPPLY SYSTEM

CROSS-REFERENCE TO RELATED APPLICATIONS

This application is based upon and claims the benefit of priority from the prior Japanese Patent Applications No. 2002-104329, filed Apr. 5, 2002; No. 2002-240460, filed Aug. 21, 2002, the entire contents of both of which are incorporated herein by reference.

BACKGROUND OF THE INVENTION

1. Field of the Invention

The present invention relates to a chemical reaction apparatus and a power supply system including this chemical reaction apparatus and, more particularly, to a chemical reaction apparatus applied to a power supply system including a fuel cell which generates electric power by using fuel.

2. Description of the Related Art

Conventionally, chemical reaction apparatuses are known in the field of chemical reaction engineering. In these chemical reaction apparatuses, various fluidized material mixtures are supplied to a reaction flow path, and a desired fluid material is produced by a chemical reaction caused by a catalyst formed in the reaction flow path, i.e., by a catalyst reaction.

These chemical reaction apparatuses have various sizes and structures in accordance with their applications. Recently, in this technical field of chemical reaction apparatuses, some chemical reaction apparatuses have been developed in which a millimeter-order or micron-order flow path is formed in a microspace of a silicon chip by using a so-called micromachine fabrication technology represented by the micropatterning technology developed in the technology of fabricating semiconductor devices such as integrated circuits, and a fluid material is supplied to the flow path to cause a predetermined chemical reaction.

FIG. 13A is an opened-up sectional view taken along a Y—Y line of an example of the conventional chemical reaction apparatuses of this type. FIG. 13B is an opened-up sectional view taken along an X—X line of the apparatus. FIG. 13C is an opened-up sectional view taken along a Z—Z line of the apparatus. To clarify the arrangement of this chemical reaction apparatus, the shape of a reaction flow path and the planar shape of a thin-film heater are hatched for the sake of convenience.

FIGS. 14A to 14C are schematic views for explaining the steps of the fabrication process of the chemical reaction apparatus.

As shown in FIGS. 13A and 13B, a chemical reaction apparatus 60p has a reaction flow path 20p formed as a trench having a micron order width and depth in one surface of a main substrate 10p which is a silicon substrate or the like by using, e.g., photoetching. For example, a predetermined catalyst 25p is adhered to the inner wall surfaces of the reaction flow path 20p. In side portions of the main substrate 10p, a supply port 20a and discharge port 20b for supplying and discharging a fluid material to and from the reaction flow path 20p are formed. A closing substrate 30p such as a glass plate is bonded to said one surface of the main substrate 10p to close the open end of the trench of the reaction flow path 20p.

As shown in FIGS. 13B and 13C, a thin-film heater 40p is provided on the other surface of the closing substrate 30p. The thin-film heater 40p is a heating resistor or the like and has a shape identical or close to the shape of the reaction flow path 20p. The thin-film heater 40p generates heat and heats the interior of the reaction flow path 20p, thereby supplying thermal energy required for a chemical reaction to the reaction flow path 20p.

Recently, research and development for downsizing power supply systems using fuel cells have been extensively done. A chemical reaction apparatus having the above arrangement can be applied to those power supply systems using fuel cells. That is, power generation fuel is supplied to the chemical reaction apparatus as described above to produce hydrogen gas by a predetermined chemical reaction. Electric power can be generated by supplying this hydrogen gas to a fuel cell.

This chemical reaction apparatus has the following various characteristic features resulting from micropatterning of the reaction flow path. That is, since the reaction flow path is micropatterned, the reaction volume of this reaction flow path decreases. Since this increases the ratio of the surface area between the reaction flow path and heater to the volume of the reaction flow path, the heat conduction characteristics upon a catalyst reaction improve, and this increases the reaction efficiency of the chemical reaction. The decreased sectional area of the reaction flow path shortens the diffusion/mixing time of reaction molecules of a fluid material supplied to the reaction flow path. This increases the rate of progress of the chemical reaction in the reaction flow path. Furthermore, the arrangement of the chemical reaction apparatus itself is downsized. This eliminates complicated reaction engineering examination, such as applied when a large-sized furnace is to be manufactured, resulting from stepwise scale-up matching the results of examination using a small-sized experimental furnace.

Unfortunately, the above chemical reaction apparatus has the following problems.

In the fabrication process of the chemical reaction apparatus 60p described above, as shown in FIG. 14A, a reaction flow path 20p is first formed as a trench having a predetermined sectional shape and flow path shape in one surface of a substrate material serving as the main substrate 10p.

As shown in FIG. 14B, a thin-film heater 40p having a planar shape identical or close to the flow path shape of the trench is provided on one surface of a substrate material serving as the closing substrate 30p.

Then, as shown in FIG. 14C, the main substrate 10p and closing substrate 30p are aligned such that the position of the reaction flow path 20p which is the trench formed in the main substrate 10p and the position of the thin-film heater 40p formed on the closing substrate 30p accurately correspond to each other, and said one surface of the main substrate 10p and the other surface of the closing substrate 30p are bonded.

When the trench of the reaction flow path 20p and the corresponding thin-film heater 40p are formed by micron-order dimensions as described above, fine positional shift during alignment of the main substrate 10p and closing substrate 30p leads to positional shift between the reaction flow path 20p and thin-film heater 40p. This positional shift has large influence on, e.g., the reaction characteristics of the chemical reaction. Therefore, the accuracy of alignment of the two substrates must be very high. This may make the operation in the substrate bonding step complicated and time-consuming, or may require a high-accuracy fabrication apparatus to increase the cost.

Also, in the structure in which the open end of the trench of the reaction flow path 20p is closed by bonding the main substrate 10p and closing substrate 30p as described above, } if bonding or adhesion between the two substrates is unsatisfactory, a fluid material flowing in the reaction flow path 20p may leak, or the two substrates may peel off or break owing to a thermal expansion coefficient difference between them. This sometimes poses reliability problems such as deterioration of the reaction characteristics of the chemical reaction apparatus, defective operations, and contamination to peripheral devices.

In the above chemical reaction apparatus, a Ta—Si—O-based compound is sometimes used as a heating resistor material forming the thin-film heater because the compound has appropriate resistivity. To improve the heat conduction characteristics of thermal energy from the thin-film heater to the reaction flow path and increase the reaction efficiency of the chemical reaction, the thin-film heater can be exposed to the reaction flow path. In this case, according to inspection by the present inventors, if the compound as described above is used as the heating resistor material, a fluid material produced by the chemical reaction, particularly, hydrogen gas may enter the material forming the thin-film heater to deteriorate the film quality, thereby deteriorating the heating characteristics of the thin-film heater and lowering the reaction efficiency.

FIG. 15 is a view showing the main parts of an arrangement pertaining to temperature control in a heat-treatment apparatus using the chemical reaction apparatus 60p described above.

In this heat-treatment apparatus, the temperature of the reaction flow path 20p of the chemical reaction apparatus must be accurately controlled to efficiently perform the chemical reaction. Therefore, as shown in FIG. 15, this conventional apparatus has a temperature sensor 101 installed near the reaction flow path 20p in order to perform temperature control. The temperature sensor 101 is connected to a temperature measuring unit 103 via a line 102, and the temperature measuring unit 103 measures the internal temperature of the reaction flow path 20p. The thin-film heater 40p of the chemical reaction apparatus 60p is connected to a power supply unit 105 via a line 104. On the basis of the temperature measured by the temperature measuring unit 103, a temperature controller 106 controls electric power supplied from the power supply unit 105 to the thin-film heater 40p, thereby holding the internal temperature of the reaction flow path 20p at a temperature appropriate for a desired chemical reaction. One end portion of the reaction flow path 20p is connected to the end of a supply pipe 21a, and the other end portion of the reaction flow path 20p is connected to the end of a discharge pipe 21b.

Thermal energy generated by the thin-film heater 40p is desirably used in the chemical reaction. However, the line 102 is a low-resistance conductor and at least partially contains a metal. Since the metal has high thermal conductivity, a port of the thermal energy supplied into the reaction flow path 20p through the line 102 is conducted outside the chemical reaction apparatus 60p, thereby producing thermal energy loss. When the chemical reaction apparatus 60p is large, this thermal energy loss is negligibly small. However, as downsizing of this chemical reaction apparatus advances, the ratio of the thermal energy loss increases, and this decreases the energy utilization.

BRIEF SUMMARY OF THE INVENTION

The present invention has the advantages that in a chemical reaction apparatus which includes a heating element using a thin-film heater and performs a desired chemical reaction by heating the interior of a reaction flow path, the fabrication cost can be reduced by facilitating the fabrication of the chemical reaction apparatus, the reliability of bonding between a substrate in which the reaction flow path is formed and a substrate on which the thin-film heater is formed can be improved, and the energy utilization can be increased by reducing the loss of thermal energy from the thin-film heater. The present invention also has the advantages that when this chemical reaction apparatus is applied to a power supply system using a fuel reforming type fuel cell, the power supply system can be downsized by applying the chemical reaction apparatus to, e.g., a reforming unit for producing hydrogen from power generation fuel, the reliability can be improved by suppressing deterioration of the thin-film heater, and high power generation efficiency can be obtained by reducing the thermal energy loss.

To achieve the above advantages, a chemical reaction apparatus according to the present invention comprises at least one reaction region provided on a solid body such as a silicon substrate and having a continuously formed reaction flow path to which a fluid material is supplied, and a temperature adjusting layer made of a heating resistor which is formed on the body to correspond to a region including the reaction flow path and between adjacent portions of the reaction flow path, and which supplies a predetermined heat quantity to the reaction flow path. The reaction flow path may have a micron-order, micropatterned flow path shape, and a catalyst layer having a catalyst may be formed in at least a portion of the reaction flow path. The reaction flow path may be formed into a trench having a trench open end in one surface of the body including a plurality of substrates, and the temperature adjusting layer may be formed to cover the formation region of the reaction flow path and close the trench open end of the reaction flow path. The chemical reaction apparatus may further comprise a plurality of reaction regions, and these reaction regions may cause chemical reactions different from each other. This makes it possible to downsize the chemical reaction apparatus, and increase the alignment margin between the substrate in which the reaction flow path is formed and the substrate on which the temperature adjusting layer is provided. Since this facilitates bonding of the two substrates, the fabrication cost can be reduced.

The heating resistor has a thin-film layer of a compound consisting of tantalum, silicon, oxygen, and nitrogen. The total content of oxygen and nitrogen in the compound is set at 56% or less. Preferably, the total content of oxygen and nitrogen in the compound is set at 35% to 56%. The sheet resistance of the thin-film layer is set at 10 to 100 Ω/□. The resistivity of the compound is set at 0.5 to 10 mΩ·cm. The density of the compound is set at $7.0 \times 10^{22}/cm^3$ or more. Accordingly, good heating characteristics as the heating resistor can be obtained, so the reaction efficiency of the chemical reaction can be increased. In addition, the substrate on which the temperature adjusting layer is provided and the substrate in which the reaction flow path is formed can be well bonded to obtain good adhesion properties. Consequently, high reliability can be obtained.

The chemical reaction apparatus according to the present invention may further comprise a power supply unit which supplies electric power to the heating resistor, and a measuring unit which measures an electrical resistance of the heating resistor by measuring at least one of an electric current flowing through the heating resistor and a voltage applied to the heating resistor by the electric power supplied from the power supply unit to the heating resistor. Also, the chemical reaction apparatus according to the present invention may further comprise a temperature detecting unit which detects the temperature of the heating resistor on the basis of the electrical resistance of the heating resistor detected by the measuring unit, and a controlling unit which controls the electric power supplied from the power supply unit to the heating resistor on the basis of the temperature of the heating resistor detected by the temperature detecting unit. In this case, when the temperature of the heating resistor rises 100° C., a change in the electrical resistance of the heating resistor is −2% to −7% or 3% or more. This allows the heating resistor to be also used as a temperature sensor in controlling the temperature of this chemical reaction apparatus. Therefore, the energy utilization can be increased by reducing the loss of thermal energy by radiation from the chemical reaction apparatus to the outside.

When the chemical reaction apparatus having the above arrangement is applied to a power supply system including a fuel reforming type fuel cell, it is possible, as a fuel vaporizer, to supply an aqueous solution of methanol as power generation fuel to the flow path, and vaporize the fluid in the reaction flow path by heating the reaction flow path by the heating resistor. As a reforming unit, it is possible to form a reforming catalyst layer in the reaction flow path, and reform the power generation fuel in the reaction flow path by heating the reaction flow path by the heating resistor, thereby produces hydrogen. As a carbon monoxide removing unit, it is possible to form a selective oxidation catalyst layer in the reaction flow path, and remove carbon monoxide from a gas mixture containing carbon monoxide by heating the reaction flow path by the heating resistor. Electric power can be generated by supplying hydrogen produced by these units to the fuel cell, and causing hydrogen and oxygen to react with each other. As a consequence, the power supply system can be made compact, and high power generation efficiency can be obtained by reducing the thermal energy loss. It is also possible to suppress deterioration of the film quality of the heating resistor caused by hydrogen produced in the reforming unit, and obtain high reliability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A chemical reaction apparatus according to the present invention and a power supply system including this chemical reaction apparatus will be described in detail below on the basis of embodiments shown in the accompanying drawing.

<Chemical Reaction Apparatus>

First, an embodiment of a chemical reaction apparatus according to the present invention will be explained below with reference to the accompanying drawing.

(First Embodiment)

Figure 1A:
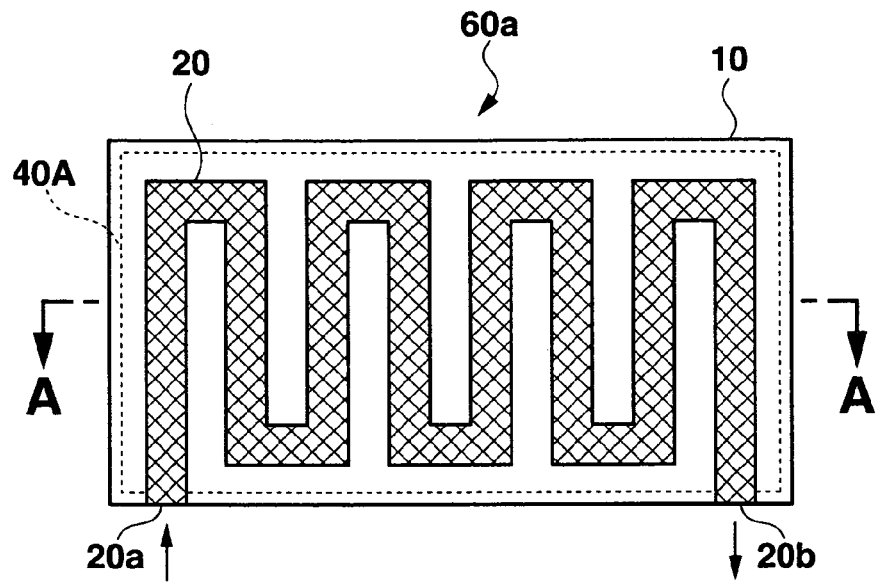
FIGS. 1A, 1B, and 1C are sectional views of the first embodiment of a chemical reaction apparatus according to the present invention.
Figure 1B:
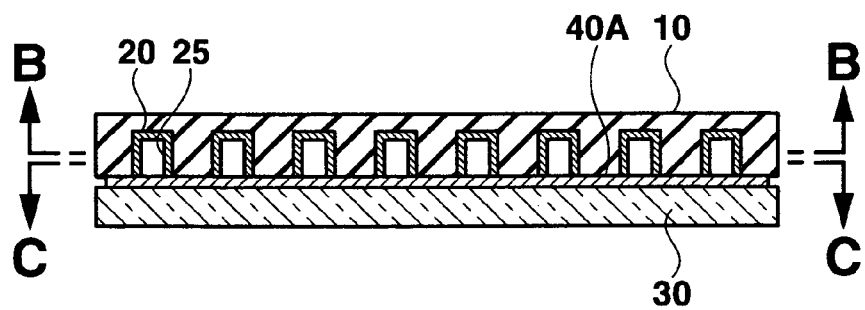
Figure 1C:
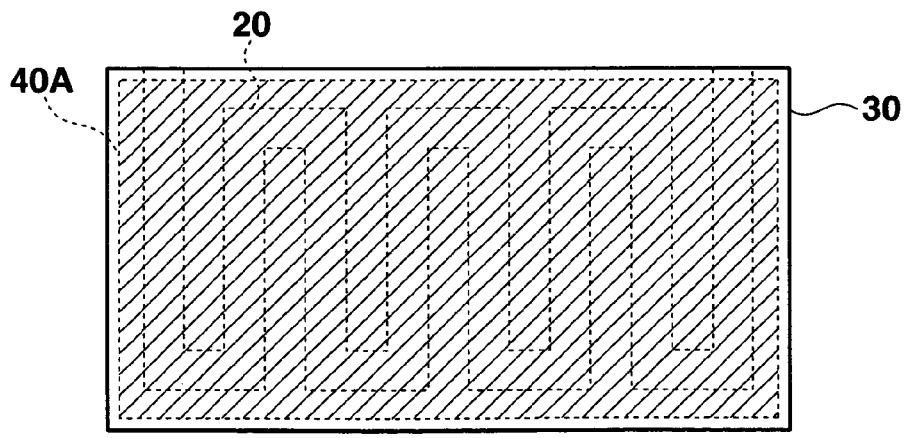

FIG. 1A is an opened-up sectional view taken along a B—B line in FIG. 1B, of the first embodiment of a chemical reaction apparatus according to the present invention. FIG. 1B is a sectional view taken along an A—A line in FIG. 1A, of the apparatus. FIG. 1C is a sectional view taken along a C—C line in FIG. 1B, of the apparatus.

Figure 2A:
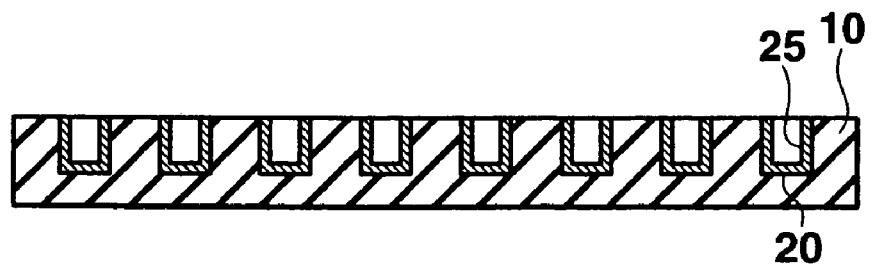
FIGS. 2A, 2B, and 2C are schematic views for explaining the steps of the fabrication process of the first embodiment of the chemical reaction apparatus according to the present invention.
Figure 2B:
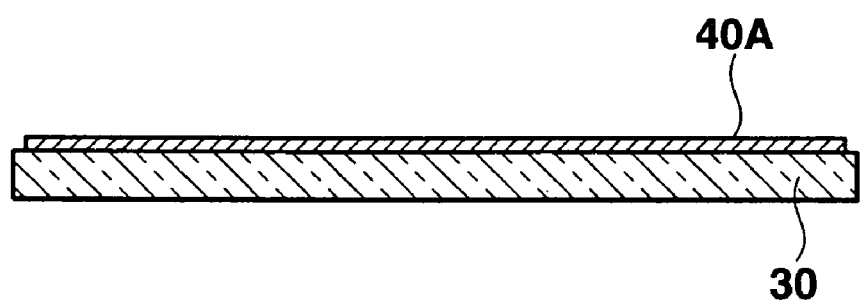
Figure 2C:
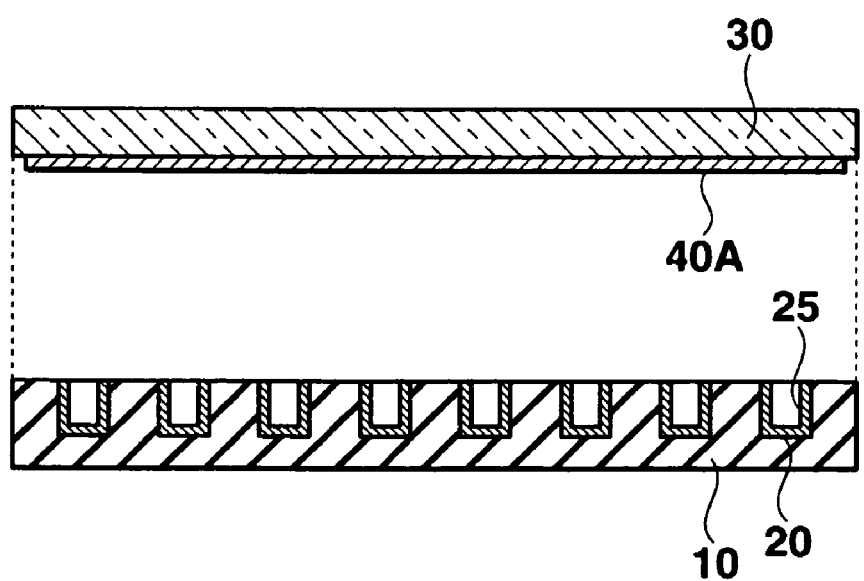

FIGS. 2A to 2C are schematic views for explaining the steps of the fabrication process of the chemical reaction apparatus according to the first embodiment. To clarify the arrangement of this chemical reaction apparatus, the shape of a reaction flow path and the planar shape of a thin-film heater are hatched for the sake of convenience.

As shown in FIGS. 1A and 1B, a chemical reaction apparatus 60a according to this embodiment roughly includes a main substrate 10, reaction flow path 20, catalyst layer 25, closing substrate 30, and thin-film heater 40A. The main substrate 10 is, e.g., a microsubstrate such as a silicon substrate. The reaction flow path 20 is formed in one surface of the main substrate 10 to have a predetermined trench-like sectional shape and zigzagged flow path shape. The catalyst layer 25 is adhered, where necessary, to the inner wall surfaces of the reaction flow path 20, e.g., the side wall surfaces and bottom surface of the reaction flow path 20. The closing substrate 30 is, e.g., a microsubstrate bonded to that one surface of the main substrate 10, which opposes the trench open end of the reaction flow path 20. The thin-film heater 40A is interposed between the main substrate 10 and closing substrate 30 and so bonded as to be partially exposed to the interior of the reaction flow path 20.

As shown in FIG. 1B, the reaction flow path 20 is obtained by etching one flat surface of the rectangular, plate-like main substrate 10 by using the photoetching technique or the like, thereby forming a trench having an arbitrary sectional shape. As shown in FIGS. 1A and 1B, the reaction flow path 20 has a flow path shape having a zigzagged pattern. The catalyst layer 25 is formed by adhering, e.g., a copper-zinc (Cu—Zn)-based catalyst to the inner wall surfaces, e.g., the side wall surfaces and bottom surface of the trench so as to have an arbitrary thickness (e.g., 1 to 100 μm) by chemical vapor deposition (CVD) or the like.

The reaction flow path 20 is so formed as to have a trench open end in one surface of the main substrate 10. To shield this open end of the reaction flow path 20 from the outside, one surface of the closing substrate 30 such as a glass substrate is bonded to close the open end. As will be described later, the thin-film heater 40A having, e.g., a rectangular shape is formed on one surface of the closing substrate 30. Consequently, the reaction flow path 20 having openings only in a supply portion 20a and discharge portion 20b for a predetermined fluid material is formed.

The catalyst layer 25 is adhered to the inner wall surfaces of the trench of the reaction flow path 20. This decreases the effective sectional area through which a fluid material can flow down and move in the section shown in FIG. 1B. However, a trench section through which a fluid material to be described later can well flow down and move, may have a width of about 100 μm or less and a depth of 500 μm or less.

As shown in FIGS. 1B and 1C, the thin-film heater 40A has a predetermined planar shape, e.g., a rectangular shape covering at least the entire formation region of the reaction flow path 20 formed in one surface of the main substrate 10. The thin-film heater 40A is a thin-film layer of a heating resistor having a predetermined material composition. As a material which forms the heating resistor of the thin-film heater 40A, it is possible to well apply a compound $Ta_xSi_yO_zN_w$ having a material composition consisting of tantalum (Ta), silicon (Si), oxygen (O), and nitrogen (N). The material characteristics of the compound $Ta_xSi_yO_zN_w$ applied as the heating resistor in the present invention will be explained in detail later.

Referring to FIG. 1A, the supply portion or inlet 20a and discharge portion or outlet 20b which supply and discharge a fluid material to and from the reaction flow path 20 are formed in side portions of the main substrate 10 and closing substrate 30 forming the reaction flow path of this chemical reaction apparatus. However, the present invention is not limited to this arrangement. For example, the supply portion 20a and discharge portion 20b may also be formed perpendicularly to the main substrate 10 or closing substrate 30.

When the chemical reaction apparatus having the above arrangement is applied to a steam reforming reaction unit of a power supply system using a fuel cell, although details will be described later, a fluid material formed by vaporizing a material substance containing of methanol and water is supplied from the supply portion 20a of the reaction flow path 20. In addition, a predetermined voltage is applied to the thin-film heater 40A to generate heat, thereby supplying predetermined thermal energy to the catalyst layer 25 adhered to the interior of the reaction flow path 20. Consequently, a catalyst reaction occurs to produce a fluid material containing of hydrogen gas and, e.g., a slight amount of carbon dioxide. This fluid material is discharged from the discharge portion 20b of the reaction flow path 20.

The fabrication process of this chemical reaction apparatus is as follows. First, as shown in FIG. 2A, the photoetching technique or the like is used to form a trench which has a predetermined flow path shape and serves as the reaction flow path 20 in one flat surface or an upper surface of a silicon substrate as the main substrate 10.

Then, a copper-zinc-based catalyst layer 25 is formed, where necessary, on the inner wall surfaces, e.g., the side wall surfaces or bottom surface of the trench by chemical vapor deposition (CVD) or the like.

Independent of the above reaction flow path formation step on the side of the main substrate 10, as shown in FIG. 2B, a thin-film heater 40A is formed in, e.g., that rectangular region of one flat surface or a lower surface of a glass substrate or the like serving as the closing substrate 30, which includes the entire flow path shape of the trench. For example, in an argon (Ar) ambient in which oxygen gas ($O_2$) and nitrogen gas ($N_2$) are mixed, the thin-film heater 40A is formed by sputtering using stripe targets of tantalum (Ta) and silicon (Si). The result is the thin-film heater 40A which is a thin Ta—Si—O—N-based film.

Subsequently, as shown in FIG. 2C, the main substrate 10 and closing substrate 30 are so aligned that the thin-film heater 40A formed on the closing substrate 30 corresponds to the whole area including the trench of the reaction flow path 20 formed in the main substrate 10. That one surface of the main substrate 10, which corresponds to the trench open end of the reaction flow path 20 is bonded to that one surface of the closing substrate 30, on which the thin-film heater 40A is formed. This bonding is performed by, e.g., anodic bonding. Consequently, as shown in FIGS. 1A to 1C, it is possible to fabricate the chemical reaction apparatus 60a in which the thin-film heater 40A is interposed between the main substrate 10 and closing substrate 30 and partially exposed to the interior of the reaction flow path 20.

In the chemical reaction apparatus according to this embodiment as described above, a rectangular thin-film heater 40A is formed on a closing substrate 30 so as to correspond to a region including the whole flow path shape of a reaction flow path 20 formed in a main substrate 10 by using the micropatterning technology such as the semiconductor fabrication technology. Therefore, even if the alignment accuracy is relatively low when the closing substrate 30 is bonded to the main substrate 10, the rectangular thin-film heater having a large size can be easily opposed to the entire flow path shape of the reaction flow path. In other words, in the substrate bonding step, the alignment margin between the two substrates can be increased. Accordingly, the operation in the substrate bonding step can be simplified without requiring any high-accuracy fabrication apparatus. So, a decrease in reliability and a rise in product cost can be well suppressed.

Also, in the chemical reaction apparatus according to this embodiment, the thin-film heater is exposed to the interior of the reaction flow path formed in the main substrate. This improves the conduction characteristics of thermal energy supplied from the thin-film heater to the reaction flow path and catalyst layer. This makes it possible to increase the reaction efficiency of a chemical reaction occurring in the reaction flow path, or reduce the electric power consumed to supply predetermined thermal energy, i.e., reduce the amount of electric energy applied to the thin-film heater.

As described in "Description of the Related Art", when an arrangement in which a thin-film heater is exposed to the interior of a reaction flow path is applied, the film quality of the thin-film heater deteriorates, although it depends on the material used as this thin-film heater, owing to a fluid material, particularly, hydrogen gas, produced by a chemical reaction occurring in the reaction flow path. This sometimes worsens the heating characteristics and lowers the reaction efficiency of the chemical reaction. In addition, since the thin-film heater is interposed between the main substrate and closing substrate, the material characteristics must be so set as to obtain appropriate bonding properties or adhesion properties, in order to suppress peeling or breaking resulting from a thermal expansion coefficient difference produced by heating. Furthermore, the heating characteristics when the thin-film heater is formed into, e.g., a thin long shape substantially equal to the shape of the zigzagged reaction flow path as described in "Description of the Related Art" are different from those when the thin-film heater is formed into a rectangular shape according to this embodiment. Accordingly, settings must be so performed as to obtain appropriate resistivity.

The present inventors, therefore, made extensive studies on various thin Ta—Si—O—N-based films to be applied to the heating resistor of the thin-film heater, and found the relationship between the material composition and material characteristics well applicable to a chemical reaction apparatus which can also be used as a fuel supply unit or the like of a power supply system to be described later. This will be described in detail below by presenting experimental data.

(Relationship Between Heating Characteristics and Resistivity)

First, the relationship between the heating characteristics and resistivity of the heating resistor of the thin-film heater will be explained below.

As described above, the purpose of the heating resistor applied to the thin-film heater is to generate heat when an electric current is supplied, and thus supply predetermined thermal energy to the reaction flow path. Therefore, this heating resistor must have a certain electrical resistance. When the planar shape of the thin-film heater is a rectangle as in this embodiment, this shape has a shorter length and larger sectional area than those of a thin and long zigzagged shape identical or close to the shape of the zigzagged reaction flow path as explained in "Description of the Related Art". Hence, if this thin-film heater is made of the same material as the conventional one, the electrical resistance decreases. To obtain a predetermined electrical resistance with this shape, therefore, it is necessary to use a heating resistor material having a higher resistivity than that of the heating resistor material used in the thin-film heater having the conventional shape.

If the sheet resistance of the thin-film heater is too small, e.g., about 1 Ω/□ or less, the electrical resistance of this thin-film heater becomes equivalent to the electrical resistance of the peripheral structure of the thin-film heater, e.g., the contact resistance with respect to a heater line in a wiring electrode. Since this decreases the electrical resistance difference, no sufficient heat generation amount can be obtained. Accordingly, a chemical reaction in the reaction flow path cannot be well accelerated any longer, and extra electric power is consumed. On the other hand, if the sheet resistance of the thin-film heater is too large, e.g., larger than about 100 Ω/□, it becomes difficult to obtain a good ohmic contact in the peripheral structure of the thin-film heater, e.g., in the wiring electrode.

The present inventors made extensive studies in consideration of the above situation, and found that the sheet resistance of the thin-film heater is desirably set to about 10 Ω/□ or more, and more preferably, about 10 Ω/□ (inclusive) to about 100 Ω/□ (inclusive). This thin-film heater is formed to have a film thickness of 1,000 to 2,000 Å.

A resistivity to be set in the thin-film heater is calculated on the basis of this sheet resistance. When a sheet resistance R is 10 Ω/□, a resistivity ρ is calculated to be 1 mΩ·cm if a film thickness t of the heating resistor forming the thin-film heater is 1,000 Å, and the resistivity ρ is calculated to be 0.5 mΩ·cm if the film thickness t is 2,000 Å.

When the sheet resistance R is 100 Ω/□, the resistivity ρ is calculated to be 10 mΩ·cm if the film thickness t of the heating resistor is 1,000 Å, and the resistivity ρ is calculated to be 5 mΩ·cm if the film thickness t is 2,000 Å.

From the foregoing, the resistivity of the thin-film heater applicable to the chemical reaction apparatus having the arrangement according to the present invention is desirably set to be about 0.5 mΩ·cm or more, and more preferably, about 0.5 mΩ·cm to about 10 mΩ·cm.

Table 1 shows experimental data obtained by examining the relationship between the material composition and resistivity of a Ta—Si—O—N-based material. In Table 1, a [Sample] column indicates examined experimental samples A to M, and [Ta (tantalum)], [Si (silicon)], [O (oxygen)], and [N (nitrogen)] columns indicate the composition ratios of the corresponding materials. A [(O+N)/(Ta+Si+O+N)] column indicates the contents of oxygen and nitrogen with respect to the whole material. The material composition ratios, i.e., the contents of tantalum, silicon, oxygen, and nitrogen of the experimental samples A to M are made different from each other, and the contents of oxygen and nitrogen with respect to the whole material are also made different. As indicated by the evaluation column in Table 1, the material composition range within which resistivity in the above numerical value range (0.5 to 10 mΩ·cm) can be obtained is about 56% or less, and more preferably, about 35% to 56%, as the total content of oxygen and nitrogen with respect to the whole Ta—Si—O—N-based material.

TABLE 1

| Sample | Ta [%] | Si [%] | O [%] | N [%] | O + N / Ta + Si + O + N | Resistivity (mΩ · cm) | Evaluation |
|---|---|---|---|---|---|---|---|
| A | 40.3 | 24.6 | 20.0 | 14.3 | 0.35 | 0.56 | ○ |
| B | 36.0 | 23.5 | 19.7 | 20.0 | 0.40 | 0.74 | ○ |

TABLE 1-continued

| Sample | Ta [%] | Si [%] | O [%] | N [%] | O + N / Ta + Si + O + N | Resistivity (mΩ·cm) | Evaluation |
|---|---|---|---|---|---|---|---|
| C | 36.0 | 23.0 | 20.1 | 20.0 | 0.40 | 0.78 | ○ |
| D | 32.0 | 22.0 | 27.0 | 18.0 | 0.45 | 1.26 | ○ |
| E | 30.0 | 20.0 | 35.6 | 13.6 | 0.50 | 2.40 | ○ |
| F | 29.0 | 20.5 | 35.0 | 14.8 | 0.50 | 2.55 | ○ |
| G | 29.2 | 21.5 | 35.0 | 13.2 | 0.49 | 2.74 | ○ |
| H | 27.5 | 20.0 | 31.5 | 20.0 | 0.52 | 3.99 | ○ |
| I | 29.0 | 22.0 | 36.0 | 12.0 | 0.43 | 5.00 | ○ |
| J | 25.3 | 18.0 | 37.0 | 18.9 | 0.56 | 8.74 | ○ |
| K | 23.8 | 19.0 | 45.2 | 11.0 | 0.57 | 12.00 | Δ |
| L | 22.5 | 18.0 | 46.5 | 12.0 | 0.59 | 12.69 | Δ |
| M | 23.6 | 18.5 | 48.0 | 9.2 | 0.58 | 14.31 | Δ |

Accordingly, in the chemical reaction apparatus in which the rectangular thin-film heater is so formed as to correspond to the region including the entire flow path shape of the reaction flow path formed in the main substrate as described above, the sheet resistance of the heating resistor forming the thin-film heater is set to an arbitrary value within the range of about 10 to 100 Ω/□, the resistivity of the heating resistor is set to an arbitrary value within the range of about 0.5 to 10 mΩ·cm, or the total content of oxygen and nitrogen in the heating resistor is set to an arbitrary value within the range of about 35% to 56%. Consequently, it is possible to obtain good heating characteristics of the thin-film heater, and efficiently promote a predetermined chemical reaction in the reaction flow path.

(Relationship Between Material Composition and Density)

The relationship between the material composition and density of the heating resistor forming the thin-film heater will be described below.

Figure 3:
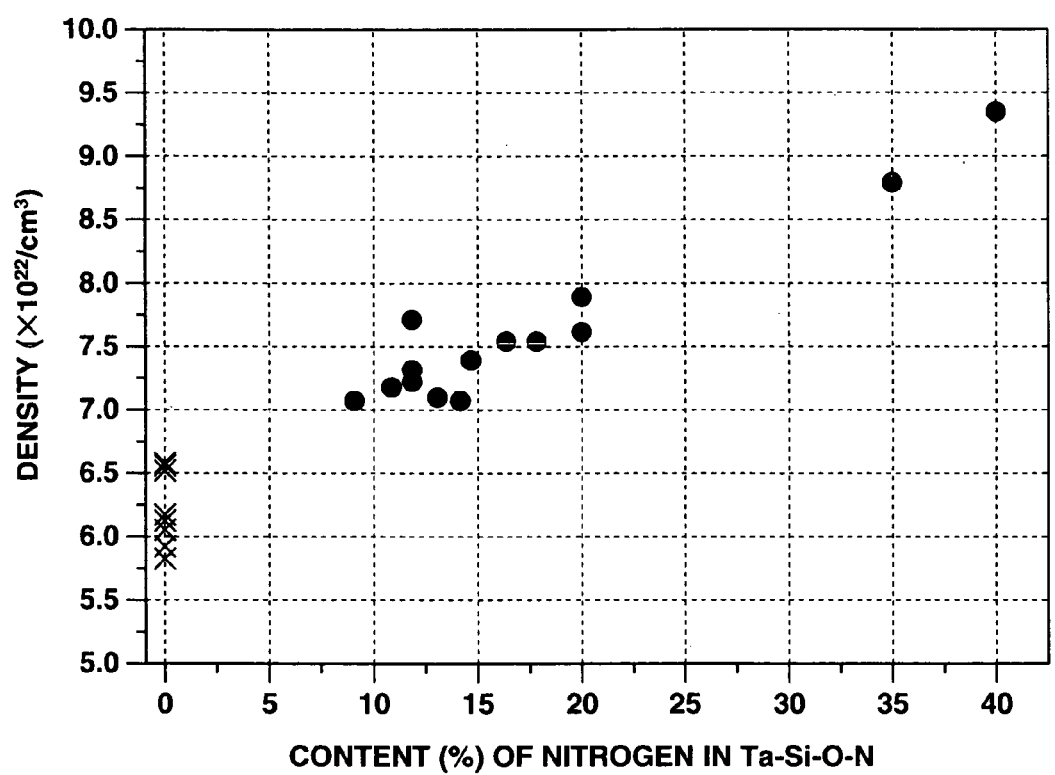
FIG. 3 is a graph showing the relationship between the nitrogen content and density of a Ta—Si—O—N-based compound used as a heating resistor which forms a thin-film heater applied to the chemical reaction apparatus according to the present invention.

FIG. 3 shows experimental data indicating the relationship between the nitrogen content and density of a Ta—Si—O—N-based compound used in the heating resistor forming the thin-film heater applied to the chemical reaction apparatus according to this embodiment.

Dots plotted by x on the left side of FIG. 3 indicate densities when the nitrogen content is 0%, i.e., the densities of Ta—Si—O-based compounds.

As described previously, when the arrangement in which the thin-film heater is exposed to the interior of the reaction flow path is applied, a fluid material, particularly, hydrogen gas produced by the chemical reaction occurring in the reaction flow path deteriorates the film quality of the thin-film heater made of, e.g., a normal metal or low-density oxide. Therefore, the heating resistor must have a high hydrogen resistance.

Since a Ta—Si—O—N-based compound was applied as the heating resistor forming the thin-film heater as described in this embodiment, as shown in FIG. 3, a relatively high density was obtained compared to a Ta—Si—O-based compound (x on the left side of FIG. 3) conventionally used as the heating resistor. In addition, the density rose in proportion to the total content of oxygen and nitrogen (● in FIG. 3).

The present inventors made extensive studies and found that to prevent deterioration of the film quality caused by invasion of hydrogen, the density is desirably set to be larger than about $7.0 \times 10^{22}/cm^3$.

When the density of the heating resistor is thus set, nitrogen bonds to a (Ta+Si+O)-based compound to increase the density, and invasion of hydrogen produced in the reaction flow path is suppressed. Therefore, even when the arrangement in which the thin-film heater is exposed to the interior of the reaction flow path is applied as described in this embodiment, predetermined heating characteristics can be maintained without deteriorating the film quality of the thin-film heater. Consequently, the reaction efficiency of the chemical reaction in the reaction flow path can be increased.

(Relationship Between Material Composition and Bonding Properties/Adhesion Properties)

The relationship between the material composition of the heating resistor forming the thin-film heater and the properties of bonding and adhesion to the substrate material will be explained below.

In the step of bonding a silicon substrate and glass substrate, it is possible to apply anodic bonding by which the two substrates are heated to 300 to 400° C., and a voltage of 500 V to 1 kV is applied to generate electrostatic attraction between silicon and glass, thereby chemically bonding the substrates in the interface between them. By this anodic bonding, good bonding properties can be obtained between the two substrates without using any adhesive or the like.

As described earlier, this embodiment has the arrangement in which the thin-film heater is interposed between the main substrate and closing substrate. Even in this arrangement, it is necessary to realize good bonding properties equivalent to those obtained by anodic bonding described above.

In this embodiment, therefore, a hydrogenating process in which the Ta—Si—O—N-based material used as the heating resistor is heated in a hydrogen gas ambient is performed. As a consequence, the heating resistor forming the thin-film heater can be made of a Ta—Si—O—N—H compound obtained by this hydrogenating process. Since this Ta—Si—O—N—H material is insufficiently oxidized or nitrided, anodic bonding described above can be well applied even in bonding between the main substrate and thin-film heater. Accordingly, each substrate and the thin-film heater can be well bonded while the chemical reaction apparatus fabrication process is made simple and efficient, without performing any other bonding step using an adhesive or the like.

Also, when the thin-film heater is interposed between the main substrate and closing substrate as in this embodiment, thermal expansion or thermal shrinkage occurs in the thin-film heater, main substrate, or closing substrate as the thin-film heater generates heat. In this case, any of these parts may peel off or break owing to differences between their thermal expansion coefficients. To prevent this peeling or breaking, the closing substrate and thin-film heater must have good adhesion properties.

The present inventors made extensive studies on this matter and found that a Ta—Si—O—N-based compound as described in this embodiment has very good adhesion properties with respect to, e.g., a silicon substrate having a thermal oxide film or a glass substrate made of pyrex or quartz glass, compared to metal-based resistor materials such as aluminum (Al), titanium-tungsten (TiW), copper (Cu), platinum (Pt), and palladium (Pd) generally used as heating resistors. Accordingly, the silicon substrate and glass substrate described above are used as the main substrate and closing substrate. Even when thermal expansion or thermal shrinkage occurs as the thin-film heater generates heat, these substrates are relatively strong against thermal stress. Consequently, peeling and breaking of the main substrate and closing substrate can be well prevented.

(Second Embodiment)

Figure 4A:
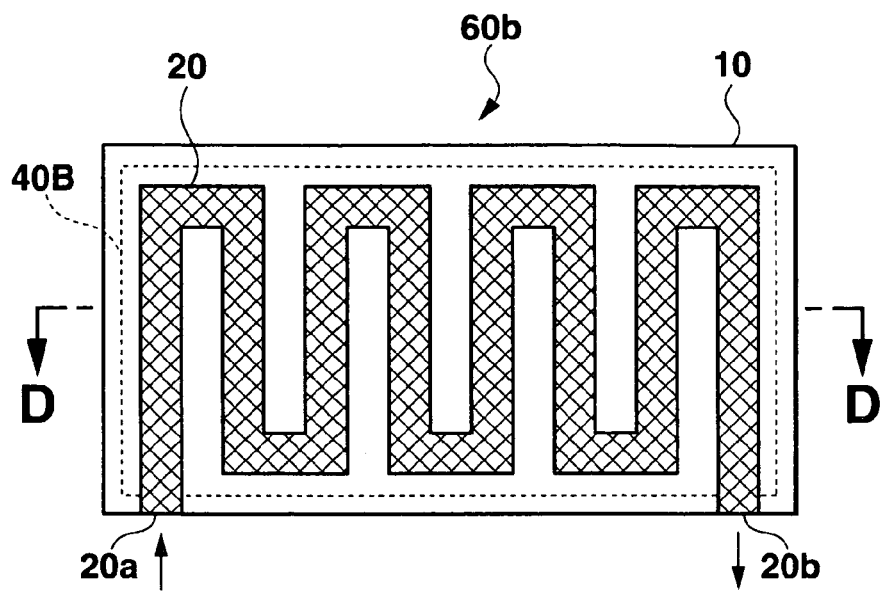
FIGS. 4A, 4B, and 4C are sectional views of the second embodiment of the chemical reaction apparatus according to the present invention.
Figure 4B:
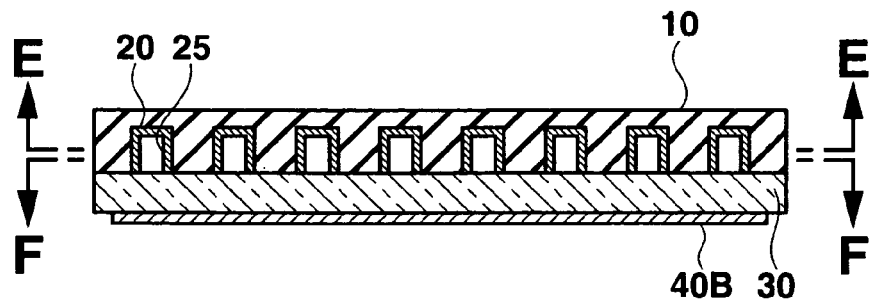
Figure 4C:
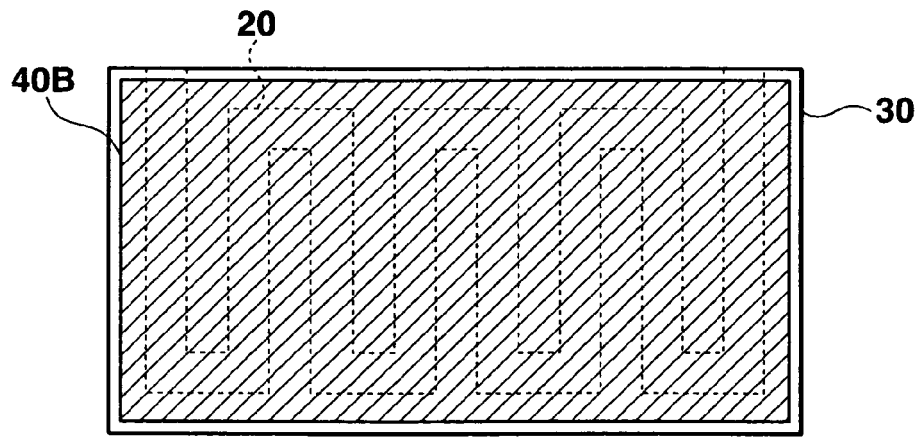

FIG. 4A is an opened-up sectional view taken along an E—E line in FIG. 4B, of the second embodiment of the chemical reaction apparatus according to the present invention. FIG. 4B is a sectional view taken along a D—D of line in FIG. 4A, the apparatus. FIG. 4C is a sectional view taken along an F—F line in FIG. 4B, of the apparatus.

Figure 5A:
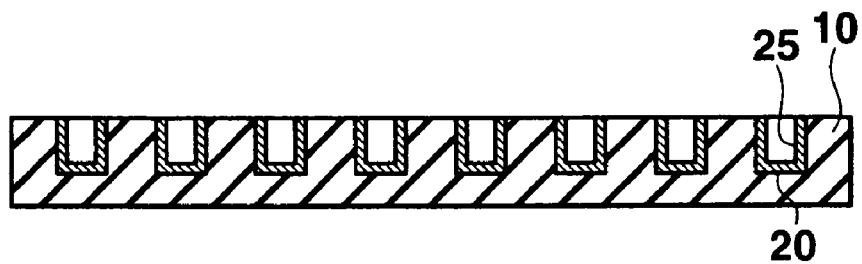
FIGS. 5A, 5B, and 5C are schematic views for explaining the steps of the fabrication process of the second embodiment of the chemical reaction apparatus according to the present invention.
Figure 5B:
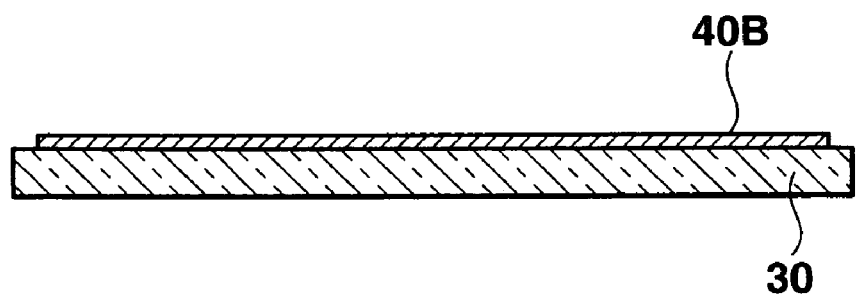
Figure 5C:
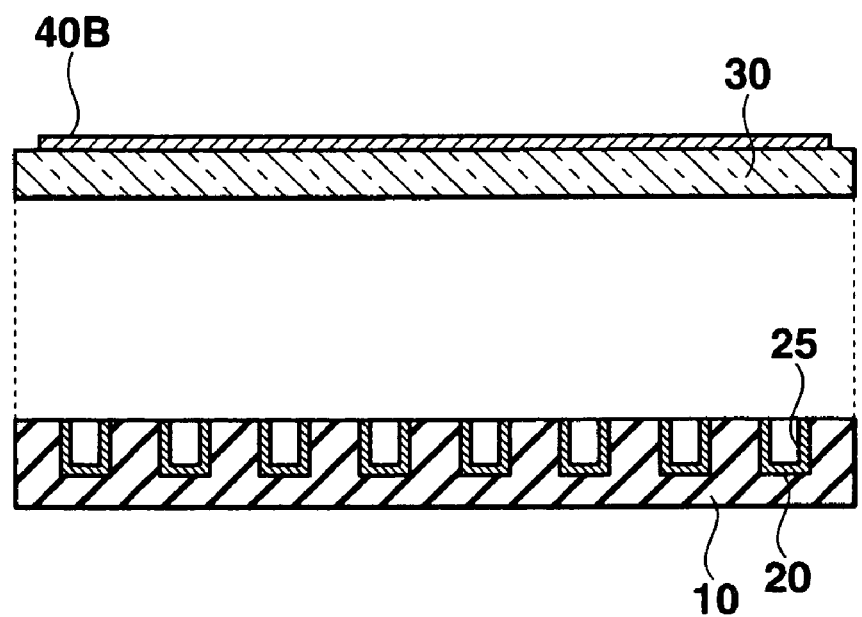

FIGS. 5A, 5B, and 5C are schematic views for explaining the steps of the fabrication process of the chemical reaction apparatus according to the second embodiment. To clarify the arrangement of this chemical reaction apparatus, the shape of a reaction flow path and the planar shape of a thin-film heater are hatched for the sake of convenience.

As shown in FIGS. 4A and 4B, a chemical reaction apparatus 60b according to this embodiment roughly includes a main substrate 10, reaction flow path 20, catalyst layer (not shown), closing substrate 30, and thin-film heater 40B. The main substrate 10 is, e.g., a microsubstrate such as a silicon substrate. The reaction flow path 20 is formed in one flat surface of the main substrate 10 to have a predetermined trench-like sectional shape and zigzagged flow path shape. The catalyst layer is adhered, where necessary, to the inner wall surfaces of the reaction flow path 20. The closing substrate 30 is, e.g., a microsubstrate bonded to that one surface of the main substrate 10, which opposes the trench open end of the reaction flow path 20. The thin-film heater 40B is formed on the other flat surface of the closing substrate 30, i.e., on that surface of the closing substrate 30, which is not bonded to the main substrate.

As shown in FIGS. 4B and 4C, the thin-film heater 40B has a predetermined planar shape, e.g., a rectangular shape covering at least the entire formation region of the reaction flow path 20 formed in one surface of the main substrate 10. As in the first embodiment described above, the thin-film heater 40B is a thin-film layer of a compound made of $Ta_xSi_yO_zN_w$. The relationships between the material composition and various characteristics of the compound $Ta_xSi_yO_zN_w$ are equal to those explained in the first embodiment, so a detailed explanation thereof will be omitted. Also, the arrangement of the reaction flow path 20 is equal to that of the above-mentioned embodiment, so a detailed explanation thereof will be omitted.

The fabrication process of this chemical reaction apparatus is as follows. First, as shown in FIG. 5A, following the same procedures as in FIGS. 2A and 2B of the first embodiment, the photoetching technique or the like is used to form a trench serving as the reaction flow path 20 in one surface of a silicon substrate as the main substrate 10. Then, a copper-zinc-based catalyst layer is formed, where necessary, on the inner wall surfaces of the trench by chemical vapor deposition (CVD) or the like.

As shown in FIG. 5B, a thin-film heater 40B is formed in, e.g., that rectangular region of one surface of a glass substrate or the like serving as the closing substrate 30, which includes the entire flow path shape of the trench.

Subsequently, as shown in FIG. 5C, the main substrate 10 and closing substrate 30 are so aligned that the thin-film heater 40B formed on the closing substrate 30 corresponds to the whole area including the trench of the reaction flow path 20 formed in the main substrate 10. That one surface of the main substrate 10, which corresponds to the trench open end of the reaction flow path 20 is bonded to that other surface of the closing substrate 30, on which the thin-film heater 40B is not formed. Consequently, as shown in FIGS. 4A to 4C, it is possible to fabricate the chemical reaction apparatus in which the main substrate 10 and closing substrate 30 are directly bonded, and the rectangular thin-film heater 40B corresponding to the whole area of the reaction flow path 20 is formed on that one surface of the closing substrate 30, which is not bonded to the main substrate 10.

In the chemical reaction apparatus according to this embodiment as described above, as in the first embodiment described previously, even if the alignment accuracy is relatively low when the closing substrate is bonded to the main substrate, the rectangular thin-film heater having a large size can be easily opposed to the entire flow path shape of the reaction flow path. Accordingly, the substrates can be bonded by a simple operation without requiring any high-accuracy fabrication apparatus. So, a decrease in reliability and a rise in product cost can be well suppressed.

In each of the above embodiments, a predetermined catalyst layer is adhered to the interior of the reaction flow path, and an endothermic catalyst reaction is induced by supplying predetermined thermal energy from the thin-film heater, thereby producing a desired fluid material. However, the present invention is not limited to these embodiments. That is, a material substance may also be evaporated by a vaporization reaction by simply supplying thermal energy from the thin-film heater without forming any catalyst layer in the reaction flow path. Practical chemical reaction examples will be explained in applications of the chemical reaction apparatus to be described later.

(Third Embodiment)

Figure 6:
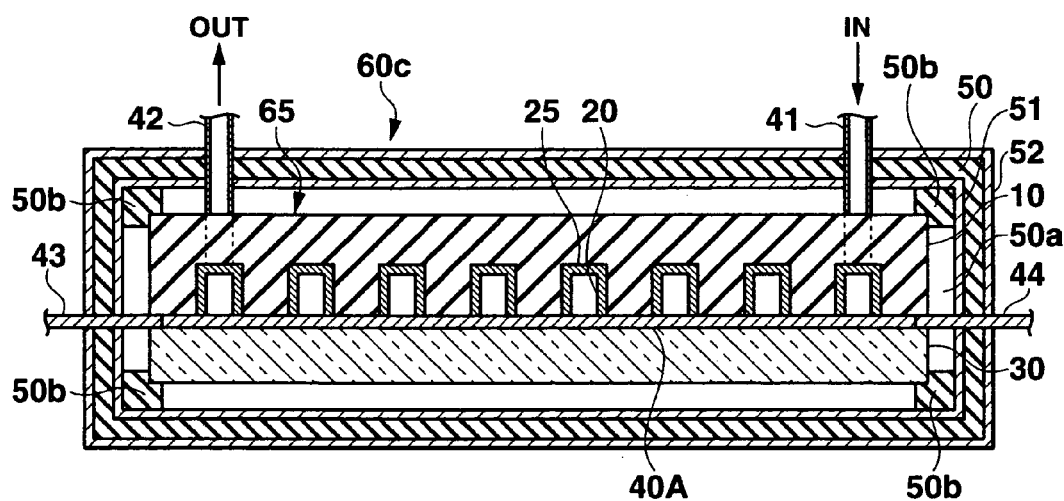
FIG. 6 is a sectional view of the third embodiment of the chemical reaction apparatus according to the present invention.

FIG. 6 is a sectional view of the third embodiment of the chemical reaction apparatus according to the present invention. In FIG. 6, the same reference numerals as in the first and second embodiments described above denote the same parts, and an explanation thereof will be omitted or simplified.

As shown in FIG. 6, a chemical reaction apparatus 60c according to this embodiment has an arrangement in which a reaction flow path formation member 65 having a structure similar to that of the chemical reaction apparatus 60a of the first embodiment or the chemical reaction apparatus 60b of the second embodiment is accommodated in a box member 50 via support members 50b. For example, the support members 50b are formed at the four corners of the reaction flow path formation member 65.

A hollow portion 50a is formed between the inner walls of the box member 50 and the outer surfaces of the reaction flow path formation member 65, except for portions of the support members 50b. In the embodiment shown in FIG. 6, the reaction flow path formation member 65 has a structure similar to that of the chemical reaction apparatus 60a of the first embodiment. However, the present invention is not limited to this arrangement. For example, the reaction flow path formation member 65 may also have a structure similar to that of the chemical reaction apparatus 60b of the second embodiment.

The end of a supply pipe 41 is connected to one end portion of a reaction flow path 20, and the supply pipe 41 extends to the outside through the box member 50. Likewise, the end of a discharge pipe 42 is connected to the other end portion of the reaction flow path 20, and the discharge pipe 42 extends to the outside through the box member 50.

Lead lines 43 and 44 are connected to a thin-film heater 40A and extended outside the box member 50 through it.

The chemical reaction apparatus 60c according to the third embodiment is so designed as to suppress radiation of heat to the surroundings from the outer surfaces of the reaction flow path formation member 65 including the reaction flow path and thin-film heater. For this purpose, the hollow portion 50a is formed as a heat insulating structure, thereby suppressing radiation of heat to the outside of the box member 50. The heat insulating performance may be improved by sealing a gas such as air, freon, or carbonic acid gas in the hollow portion 50a. The heat insulating performance may be further improved by setting the hollow portion 50a in a substantially vacuum state.

As shown in FIG. 6, a radiation shielding film 51 is formed on the inner walls of the box member 50, and a radiation shielding film 52 is formed on the outer surfaces of the box member 50. Only one of the radiation shielding films 51 and 52 may also be formed. The radiation shielding films 51 and 52 have high reflectivity to electromagnetic waves. Since the radiation shielding films 51 and 52 are formed on the surfaces of the box member 50, electromagnetic waves (e.g., infrared radiation) generated in the reaction flow path formation member 65 are reflected inside the box member 50. This suppresses propagation of the electromagnetic waves to the outside of the box member 50, thereby further reducing radiation of heat to the outside.

When the hollow portion 50a is evacuated, the heat insulating performance can be improved as the internal pressure of the hollow portion 50a is lowered. More specifically, the internal pressure of the hollow portion 50a can be decreased to about 100 Pa or less. When the pressure is set to about 100 Pa, electric power to be applied to the thin-film heater 40B can be reduced by about 30% compared to that when the hollow portion 50a is set at atmospheric pressure. More preferably, the internal pressure of the hollow portion 50a is set to be lower than about 10 Pa. When the pressure is set at about 10 Pa, electric power to be applied to the thin-film heater 40B can be reduced to substantially half that when the hollow portion 50a is set at atmospheric pressure.

<Example of Application to Power Supply System>

A practical example of the arrangement when the chemical reaction apparatus of any of the above embodiments is applied to a power supply system including a fuel reforming type fuel cell will be described below.

Figure 7:
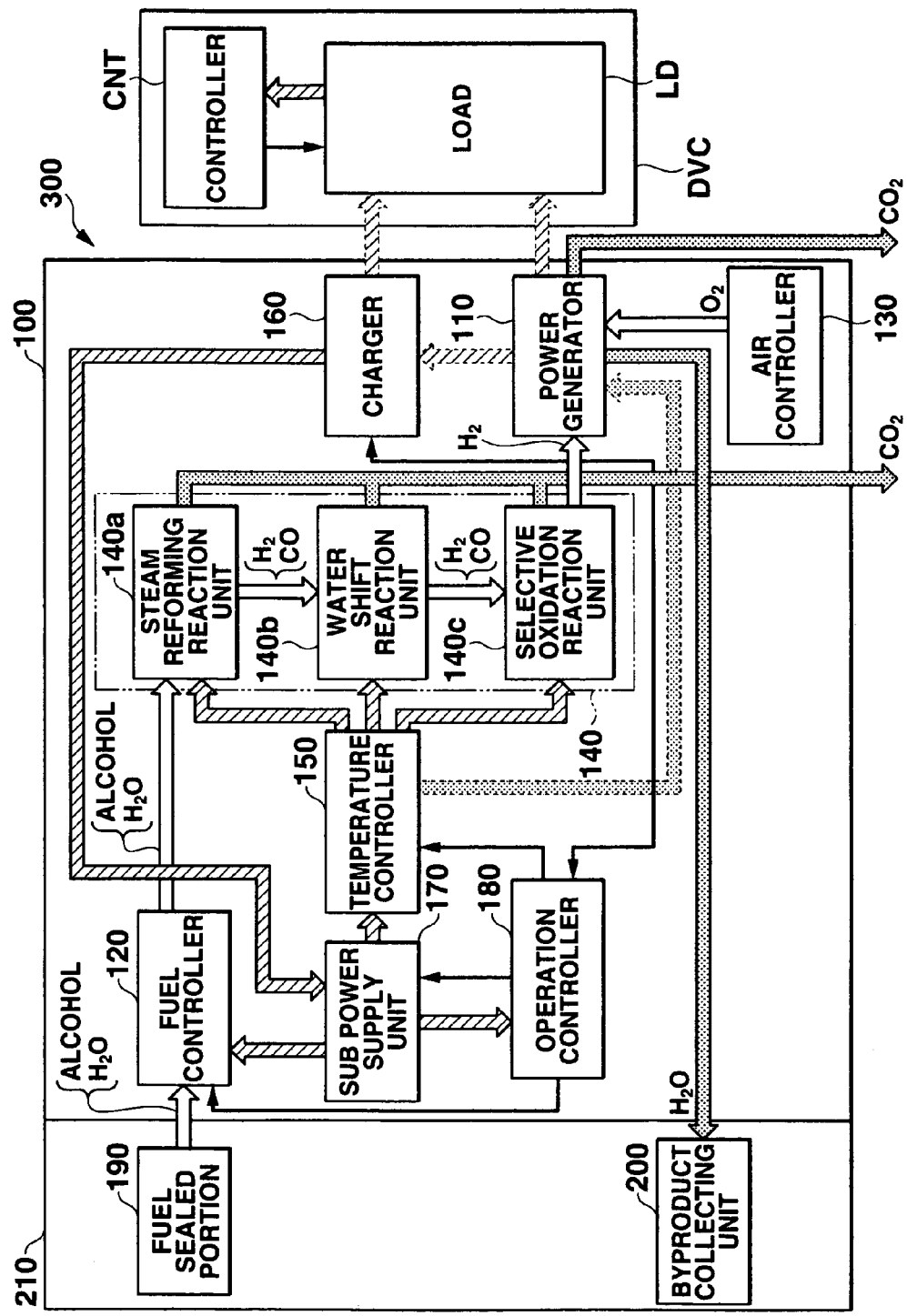
FIG. 7 is a block diagram showing an example of the arrangement of the main parts of a power supply system to which the chemical reaction apparatus according to the present invention is applicable.

FIG. 7 is a block diagram showing an example of the arrangement of the main parts of a power supply system to which the chemical reaction apparatus of any of the above embodiments is applicable.

Figure 8A:
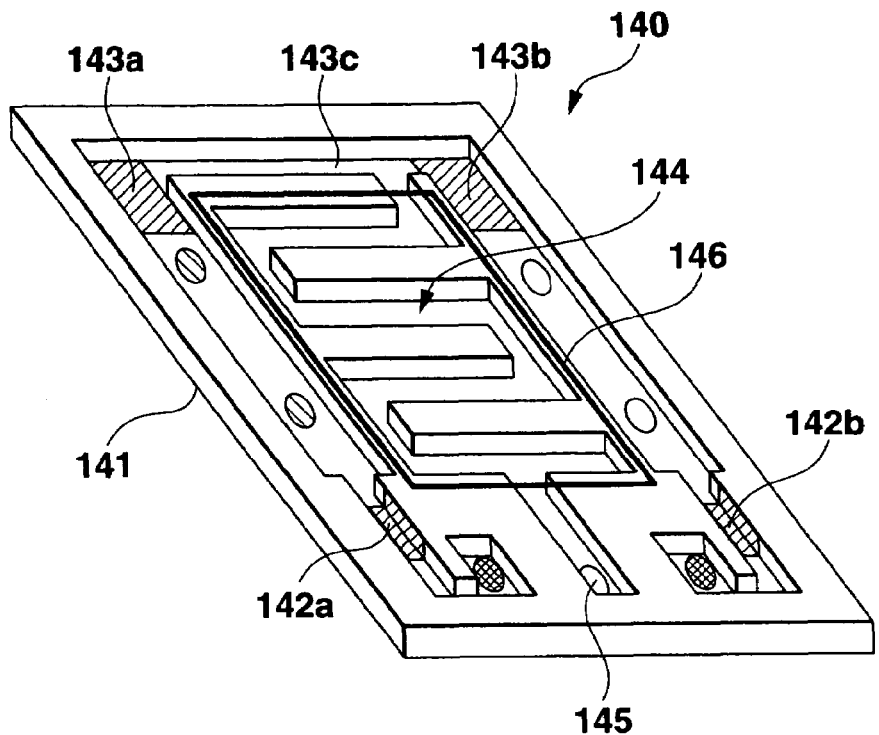
FIGS. 8A and 8B are schematic views showing outlines of practical examples of the arrangement of the chemical reaction apparatus according to the present invention which can be applied to the power supply system.
Figure 8B:
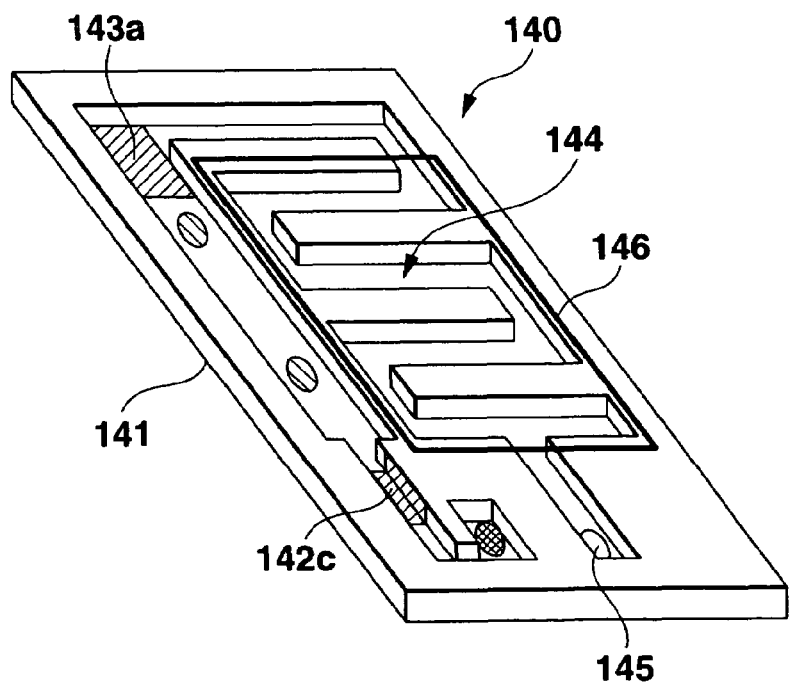

FIGS. 8A and 8B are schematic views showing outlines of examples of practical arrangements, which can be applied to the above power supply system, of the chemical reaction apparatus according to the present invention.

In the following description, a power supply system using a fuel reforming type polymer electrolyte fuel cell will be explained.

(Overall Arrangement)

As shown in FIG. 7, a power supply system 300 to which the chemical reaction apparatus according to the present invention is applicable roughly comprises a power generation module 100 which generations electric power from predetermined power generation fuel, and a fuel pack 210 which is detachable from the power generation module 100, and in which predetermined power generation fuel is sealed.

The fuel pack 210 has a fuel sealed portion 190 in which power generation fuel is sealed, and a byproduct collecting unit 200 for collecting byproducts produced by a power generation unit 110. The power generation fuel contains an alcoholic liquid such as methanol, ethanol, or butanol, and water.

The power generation module 100 roughly comprises the power generator 110 having the arrangement of a fuel reforming type polymer electrolyte fuel cell, a fuel controller 120 for controlling the supply amount, to the power generator 110, of power generation fuel stored and sealed in the fuel sealed portion 190 of the fuel pack 210, an air controller 130 for controlling the supply amount of air (oxygen) to the power generator 110, a fuel reforming unit 140 for producing hydrogen by reforming the power generation fuel supplied by the fuel controller 120, and supplying hydrogen to the power generator 110, a temperature controller 150 for heating the fuel reforming unit 140 as needed, and controlling the heated state (temperature), a charger 160 for storing and holding part or the whole of electric power generated by the power generator 110, a sub power supply unit 170 for outputting electric power necessary for the power generating operation and charging operation in the power generation module 100, the operation of detecting the charged state of the charger 160 by an operation controller 180 to be described below, and the like, and an operation controller 180 for controlling the operating states of the individual units in the power generation module 100. The chemical reaction apparatus of any of the above embodiments can be applied to the fuel reforming unit 140.

The arrangement of each unit of the power generation module 100 will be explained below.

In accordance with a command signal from the operation controller 180, the fuel controller 120 supplies, to the fuel reforming unit 140, a predetermined amount of power generation fuel supplied from the fuel sealed portion 190 by a physical means such as a capillary action or a mechanical means such as a fuel pump.

The air controller 130 takes air from outside the fuel cell system 300, and supplies oxygen gas ($O_2$) or air to the power generator 110.

The fuel reforming unit 140 roughly includes a steam reforming reaction unit 140a and carbon monoxide removing unit. The steam reforming reaction unit 140a receives power generation fuel containing, e.g., an alcoholic liquid and water in the fuel pack 210 via the fuel controller 120, vaporizes this power generation fuel, and produces hydrogen ($H_2$) and byproducts, i.e., carbon dioxide ($CO_2$) and a slight amount of carbon monoxide (CO). The carbon monoxide removing unit converts the carbon monoxide (CO) supplied from the steam reforming reaction unit 140a into carbon dioxide, and so removes the produced carbon monoxide (CO). In this example, the steam reforming reaction unit 140a has a function of vaporizing the power generation fuel. However, it is also possible to separately install a chemical reaction apparatus for vaporizing the power generation fuel. In this case, the vaporized power generation fuel is supplied to the steam reforming reaction unit 140a.

The carbon monoxide removing unit includes at least one of a water shift reaction unit 140b and selective oxidation reaction unit 140c. The water shift reaction unit 140b causes carbon monoxide (CO) supplied from the steam reforming reaction unit 140a to react with water ($H_2O$) supplied from the fuel controller 120 and/or the power generator 110, and converts into carbon dioxide ($CO_2$) and hydrogen ($H_2$). The selective oxidation reaction unit 140c causes carbon monoxide (CO) which has not completely reacted in the water shifter reaction unit 140b to react with oxygen (O), and converts into carbon dioxide ($CO_2$).

The temperature controller 150 supplies electric power, in accordance with a command signal from the operation controller 180, to the heating element which are thin-film heaters formed in the steam reforming reaction unit 140a, water shift reaction unit 140b, and selective oxidation reaction unit 140c, thereby controlling the temperature of each reaction unit. When a thin-film heater as a heating element is also formed in the power generator 110 to control the power generator 110 to a predetermined temperature, predetermined electric power is also supplied to this thin-film heater. The thin-film heater is equivalent to one of the thin-film heaters 40A and 40B explained in the above embodiments. That is, the thin-film heater is a thin-film layer made of a Ta—Si—O—N-based compound, and the material composition is so set as to obtain the various material characteristics described earlier. The arrangement of temperature control by the temperature controller 150 will be described in detail later.

The power generator 110 generates predetermined electric power from hydrogen ($H_2$) supplied from the fuel reforming unit 140 and oxygen gas ($O_2$) supplied from the air controller 130.

The charger 160 temporarily holds the electric power generated by the power generator 110. For example, the charger 160 includes one or a plurality of capacitors, and charges the capacitor or capacitors with the generated electric power, thereby storing and holding the electric power.

At least one of the power generator 110 and charger 160 supplies electric power to a load LD of a device DVC.

In accordance with a command signal from the operation controller 180, the sub power supply unit 170 supplies electric power to the fuel controller 120, temperature controller 150, and operation controller 180, and, if necessary, to the power generator 110, by using, e.g., part of the electric power stored in the charger 160.

The operation controller 180 controls the operating state of each of the above units, and controls the power generation amount of the power generator 110 as needed. For example, the operation controller 180 constantly or periodically monitors the electric power amount stored and held in the charger 160, i.e., the charged potential of the charger 160. If detecting that this charged potential becomes smaller than a predetermined value, the operation controller 180 controls the fuel controller 120 and temperature controller 150. More specifically, the operation controller 180 outputs command signals so that the fuel controller 120 supplies a necessary amount of fuel, and the temperature controller 150 causes that reaction furnace of the fuel reforming unit 140, which corresponds to the reaction flow path of the chemical reaction apparatus according to the present invention, to reach a necessary temperature for a predetermined time. In this manner, the operation controller 180 prompts the power generator 110 to perform a power generating operation, thereby generating necessary electric power.

The fuel cell system 300 made up of the power generation module 100 and fuel pack 210 supplies predetermined driving electric power to the load LD of the device DVC, thereby driving the device DVC. The device DVC is driven under the control of a controller CNT.

(Arrangement of Power Generator)

Details of the arrangement of the power generator 110 will be described below.

The power generator 110 has the arrangement of a well-known polymer electrolyte fuel cell main body, and is roughly made up of a fuel electrode (cathode) which is a carbon electrode to which fine catalyst particles such as platinum or platinum·ruthenium particles are adhered, an air electrode (anode) which is a carbon electrode to which fine catalyst particles such as platinum particles are adhered, and an ion conductive film (exchange film) interposed between these fuel electrode and air electrode.

When hydrogen gas ($H_2$) extracted via the fuel reforming unit 140 is supplied to the fuel electrode of the power generator 110 having the above arrangement, hydrogen ions (protons; $H^+$) from which electrons ($e^-$) are separated by the catalyst are produced and move to the air electrode through the ion conductive film, and the electrons ($e^-$) are extracted by the carbon electrode forming the fuel electrode and supplied to the load, as indicated by $$3H_2 \rightarrow 6H^+ + 6e^- \tag{1}$$

When oxygen gas ($O_2$) in the atmosphere is supplied to the air electrode via the air controller 130, the electrons ($e^-$) supplied via the load, the hydrogen ions ($H^+$) passed through the ion conductive film, and the oxygen gas ($O_2$) in the atmosphere are caused to react with each other by the catalyst, thereby producing water ($H_2O$), as indicated by $$6H^+ + (3/2)O_2 + 6e^- \rightarrow 3H_2O \tag{2}$$

The series of these electrochemical reactions (formulas (1) and (2)) progress at a relatively low temperature of about room temperature to 80° C. The only byproduct other than electric power is basically water ($H_2O$). As indicated by chemical reaction formulas (1) and (2), the electric power (voltage·electric current) supplied to the load by the electrochemical reactions as described above depends upon the amount of hydrogen gas ($H_2$) supplied to the fuel electrode of the power generator 110.

To cause the power generator 110 to generate power by the power generating operation using the electrochemical reactions as described above, hydrogen gas in an amount required to allow the power generator 110 to generate and output predetermined electric power must be supplied to the fuel electrode of the power generator 110. Therefore, the fuel controller 120 supplies, to the fuel reforming unit 140, fuel, water, and the like in amounts necessary to produce the required amount of hydrogen gas ($H_2$) by reforming in the fuel reforming unit 140.

The air controller 130 has a function of controlling the amount of oxygen gas ($O_2$) to be supplied to the air electrode of the power generator 110. However, as long as air equivalent to the maximum consumption amount of oxygen per unit time in the power generator 110 can be supplied, oxygen gas may also be constantly supplied when the power generator 110 is driven, without controlling the amount of oxygen gas to be supplied to the air electrode of the power generator 110. Alternatively, it is also possible to control the progress of the electrochemical reactions in the power generator 110 only with the supply amount of hydrogen gas adjusted by the fuel controller 120, and form ventilation holes instead of the air controller 130, thereby supplying, through these ventilation holes, air (atmosphere) in an amount larger than the maximum consumption amount used in the electrochemical reactions in the power generator 110.

(Arrangement of Fuel Reforming Unit)

The fuel reforming unit 140 has a function of extracting, by using a predetermined endothermic catalyst reaction (steam reforming reaction), a hydrogen component contained in power generation fuel supplied in a predetermined amount by the fuel controller 120, and supplying the extracted hydrogen component to the power generator 110.

To the fuel reforming unit 140, the arrangement of the chemical reaction apparatus including the thin-film heater according to any of the aforementioned embodiments can be well applied.

More specifically, hydrogen gas ($H_2$) is produced from hydrogen-containing, alcohol-based liquid fuel such as methanol by using a steam reforming reaction which is an endothermic catalyst reaction.

Power generation fuel applied to the fuel reforming type fuel cells presently researched and developed is fuel with which the power generator 110 can generate electric power at a relatively high energy conversion efficiency. For example, it is possible to well apply liquid materials, e.g., alcohol-based liquid fuels such as methanol, ethanol, and butanol, liquefied fuels made of hydrocarbon and vaporized at room temperature and atmospheric pressure, e.g., liquefied gases such as dimethylether, isobutane, and natural gas (CNG), and gas fuels such as hydrogen gas.

Examples of the endothermic catalyst reaction used to produce hydrogen gas in the fuel reforming unit 140 are as follows. When methanol is used as an example of the liquid fuel, a steam reforming reaction as indicated by chemical reaction formula (3) below occurs. When dimethylether is used as an example of the liquefied fuel which is vaporized at room temperature and atmospheric pressure, a stream reforming reaction as indicated by chemical reaction formula (4) below occurs.

$$CH_3OH + H_2O \rightarrow 3H_2 + CO_2 \quad (3)$$

$$CH_3OCH_3 + 3H_2O \rightarrow 6H_2 + 2CO_2 \quad (4)$$

Either steam reforming reaction well progresses under heat conditions at about 300° C. Slight amounts of products (mostly $CO_2$) other than hydrogen produced by this reforming reaction are discharged to the atmosphere. Accordingly, when the chemical reaction apparatus described in any of the above embodiments is applied to the fuel reforming unit 140, predetermined electric power is supplied from a heater power supply to the thin-film heater formed between the substrates or on the other surface of the substrate so as to correspond to the region including the whole flow path shape of the reaction flow path, and heat this thin-film heater. Consequently, predetermined thermal energy which contributes to the progress of the endothermic steam reforming-reaction indicated by chemical reaction formula (3) or (4) can be supplied to the reaction flow path. So, hydrogen gas can be well produced.

FIG. 8A shows an example of a practical arrangement applied to, e.g., the steam reforming reaction unit 140a of the fuel reforming unit 140.

As shown in FIG. 8A, in one surface of a microsubstrate 141 such as a silicon substrate corresponding to the main substrate 10 described earlier, a trench-like fuel discharge portion 142a having a predetermined sectional shape and planar shape, a water discharge portion 142b, a fuel vaporizing portion 143a, a water vaporizing portion 143b, a mixing portion 143c, a reforming reaction flow path 144, and a hydrogen gas exhaust portion 145 are formed by using the micropatterning technology such as the semiconductor fabrication technology. In addition, as shown in FIG. 8B, a rectangular thin-film heater 146 corresponding to the thin-film heater 40A described earlier is formed in that region of the microsubstrate 141, which includes the formation area of the reforming reaction flow path 144, so as to be exposed to the interior of the reforming reaction flow path 144, and a microsubstrate (not shown) corresponding to the closing substrate 30 described previously is bonded to the microsubstrate 141 via the thin-film heater 146.

The fuel discharge portion 142a and water discharge portion 142b have fluid discharge mechanisms by which power generation fuel and water as material substances in the steam reforming reaction as described above are discharged in the form of liquid grains for each predetermined amount into the flow path. The progress of the steam reforming reaction indicated by chemical reaction formula (3) is controlled on the basis of the discharge amount of power generation fuel or water in the fuel discharge portion 142a or water discharge portion 142b, although thermal energy supplied from the thin-film heater 146 is also closely related to be more exact. Therefore, the fuel discharge portion 142a and water discharge portion 142b have a fuel supply amount adjusting function.

The fuel vaporizing portion 143a and water vaporizing portion 143b vaporize power generation fuel and water discharged as liquid grains from the fuel discharge portion 142a and water discharge portion 142b, respectively, by heating, reduced-pressure processing, or the like. The mixing portion 143c produces a gas mixture of the fuel gas and steam. When a mechanism which performs vaporization by heating is used as the vaporizer of the fuel vaporizing portion 143a and water vaporizing portion 143b, a thin-film heater may be formed in that region of the microsubstrate 141, which includes the formation areas of trenches forming the fuel vaporizing portion 143a and water vaporizing portion 143b, so as to be exposed to the interiors of these trenches. This thin-film heater may also be formed on the microsubstrate which corresponds to the closing substrate 30.

The reforming reaction portion 144 and thin-film heater 146 correspond to the reaction flow path explained in each of the above embodiments. That is, the gas mixture produced in the mixing portion 143c is supplied to the reforming reaction flow path 144. The steam reforming reaction indicated by chemical reaction formula (3) or (4) is induced in a copper-zinc (Cu—Zn)-based catalyst layer (not shown) attached to the inner wall surfaces of the reforming reaction flow path 144 and in the reforming reaction flow path 144, on the basis of predetermined thermal energy supplied from the thin-film heater 146 which is formed to correspond to the region including the formation area of the reforming reaction flow path 144, thereby producing hydrogen gas ($H_2$).

The hydrogen gas exhaust portion 145 exhausts the hydrogen gas produced in the reforming reaction flow path 144, and supplies the hydrogen gas to the fuel electrode of the fuel cell forming the power generator 110 described above. Accordingly, the power generator 110 causes the series of electrochemical reactions based on chemical reaction formulas (1) and (2), and generates predetermined electric power.

As described above, the thin-film heater 40 described in the above embodiments can be formed by using the micropatterning technology so as to correspond to the region including the formation area of, e.g., the trench-like reforming reaction flow path formed in the microsubstrate 141 of the fuel reforming unit 140 having the above arrangement. As a consequence, the whole or part of the fuel reforming unit 140 or the power generation module 100 including the fuel reforming unit 140 can be integrated into a microspace. Therefore, the power generation module 100 can be downsized to have substantially the same outer shapes and outer dimensions as general-purpose primary batteries and various secondary batteries. This realizes a portable power supply having compatibility with the existing primary batteries and secondary batteries. It is of course also possible to change the outer shape of the power generation module 100 into any arbitrary shape as needed.

The power supply system described above is not limited to a fuel cell, provided that the system can generate electric power by using, as power generation fuel, a predetermined fluid material such as hydrogen gas produced by the fuel reforming unit to which the chemical reaction apparatus as described in any of the above embodiments is applied. Accordingly, this power supply system can be applied to power generators having various forms. Examples are power generation (thermal energy conversion) using thermal energy generated by combustion of a fluid material produced by the chemical reaction apparatus, power generation (by internal and external combustion engines such as a gas combustion turbine, rotary engine, and Stirling engine) which uses, e.g., dynamic energy conversion by which electric power is generated by rotating a generator by using pressure energy generated by combustion, and power generation (e.g., magneto-hydro-dynamics and thermoacoustic effect power generation) by which the fluid energy or thermal energy of power generation fuel is converted into electric power by using, e.g., the principle of electromagnetic induction.

The arrangement shown in FIG. 8A has the fuel reforming unit in which methanol or the like as power generation fuel and water supplied from the different discharge portions 142a and 142b and different supply paths are vaporized and mixed. However, power generation fuel in which methanol or the like and water are mixed in advance may also be supplied directly to the fuel reforming unit, thereby executing the steam reforming reaction for producing hydrogen gas. In this case, as shown in FIG. 8B, it is possible to apply an arrangement in which a fuel discharge portion 142c and fuel vaporizing portion 143c and a single flow path made up of a reforming reaction flow path 144 and hydrogen gas exhaust portion 145 are formed in one surface of a microsubstrate 141.

In the steam reforming reaction unit 140a having the above arrangement, a very slight amount of carbon monoxide (CO) may be produced in addition to the reaction indicated by chemical reaction formula (3) or (4). Therefore, as shown in FIG. 7, the fuel reforming unit 140 may also include a carbon monoxide removing unit which removes carbon monoxide produced by the steam reforming reaction unit 140a, in addition to the steam reforming reaction unit 140a.

That is, the fuel reforming reaction unit 140 of the power generation module 100 includes the steam reforming reaction unit 140a which, as described above, receives fuel containing an alcohol-based liquid in the fuel pack 210 and water from the fuel controller 120, and produces hydrogen ($H_2$) and carbon dioxide ($CO_2$) as a byproduct, and also produces a slight amount of carbon monoxide (CO). The fuel reforming reaction unit 140 also includes at least one of the water shift reaction unit 140b and selective oxidation reaction unit 140c as a carbon monoxide removing unit. The water shift reaction unit 140b causes the slight amount of carbon monoxide (CO) produced by the steam reforming reaction unit 140a to react with water ($H_2O$) supplied from the fuel controller 120 and/or the power generator 110, thereby producing carbon dioxide ($CO_2$) and hydrogen ($H_2$). In the selective oxidation reaction unit 140c, carbon monoxide (CO) which has not completely reacted in the water shift reaction unit 140b reacts with oxygen (O) to produce carbon dioxide ($CO_2$). With this arrangement, hydrogen ($H_2$) obtained by reforming fuel sealed in the fuel pack 210 is supplied to the power generator 110, and at the same time a slight amount carbon monoxide (CO) produced is made harmless. In the following embodiment, the carbon monoxide removing unit has both the water shift reaction unit 140b and selective oxidation reaction unit 140c.

For example, each of the water shift reaction unit 140b and selective oxidation reaction unit 140c has substantially the same structure as that shown in FIG. 8A.

That is, in the arrangement shown in FIG. 8A, the water shift reaction unit 140b has a discharge portion which discharges hydrogen gas ($H_2$) containing a slight amount of carbon monoxide (CO) remaining after reforming in the steam reforming reaction unit 140a, instead of the fuel discharge portion 142a, and has a thin-film layer made of a Ta—Si—O—N-based compound similar to the thin-film heater 146. The water shift reaction process in the water shift reaction unit 140b causes water (steam; $H_2O$) to react with carbon monoxide (CO) to generate a thermal energy of about 40.2 kJ/mol, thereby producing carbon dioxide ($CO_2$) and hydrogen ($H_2$), as indicated by

$$CO+H_2O \rightarrow CO_2+H_2 \qquad (5)$$

The produced carbon dioxide ($CO_2$) is selectively exhausted outside the power generation module 100.

The selective oxidation reaction unit 140c is formed, e.g., after the water shift reaction unit 140b, and reforms carbon monoxide (CO) which has not reacted in the water shift reaction unit 140b into carbon dioxide ($CO_2$).

The selective oxidation reaction unit 140c is obtained by omitting the fuel vaporizing portion 143a and water vaporizing portion 143b from the arrangement shown in FIG. 8A, and forming a discharge portion for discharging gas supplied from the water shift reaction unit 140b and a discharge portion for discharging air or oxygen (O) taken from outside the power generation module 100, instead of the fuel discharge portion 142a and water discharge portion 142b, respectively. In addition, the selective oxidation reaction unit 140c has a thin-film layer made of a Ta—Si—O—N-based compound similar to the thin-film heater 146.

The selective oxidation reaction process in the selective oxidation reaction unit 140c causes oxygen ($O_2$) to react with carbon monoxide (CO) to generate a thermal energy of about 283.5 kJ/mol, thereby producing carbon dioxide ($CO_2$), as indicated by

$$CO+(½)O_2 \rightarrow CO_2 \qquad (6)$$

The selective oxidation reaction unit 140c may also be formed between the steam reforming reaction unit 140a and water shift reaction unit 140b.

Slight amounts of products (mostly carbon dioxide ($CO_2$)) other than hydrogen ($H_2$) produced by the series of fuel reforming reactions described above are exhausted to the atmosphere through exhaust holes formed in the power generation module 100.

The arrangement shown in FIG. 8A or 8B includes the fuel vaporizing portion 143a and water vaporizing portion 143b for vaporizing power generation fuel and water, respectively, and the reforming reaction flow path 144 for producing hydrogen by reforming the vaporized power generation fuel. However, the present invention is not limited to this arrangement. For example, a chemical reaction apparatus which has only an arrangement corresponding to the fuel vaporizing portion 143a and water vaporizing portion 143b and which vaporizes power generation fuel and water may be installed as a vaporizer before the steam reforming reaction unit 140a. This chemical reaction apparatus can be formed by using an arrangement similar to that shown in FIG. 8A or 8B without forming any catalyst layer.

When a vaporizer like this is formed, in the steam reforming reaction unit 140a the fuel vaporizing portion 143a and water vaporizing portion 143b can be omitted from the arrangement shown in FIG. 8A or 8B.

(Arrangement of Temperature Control)

Figure 9:
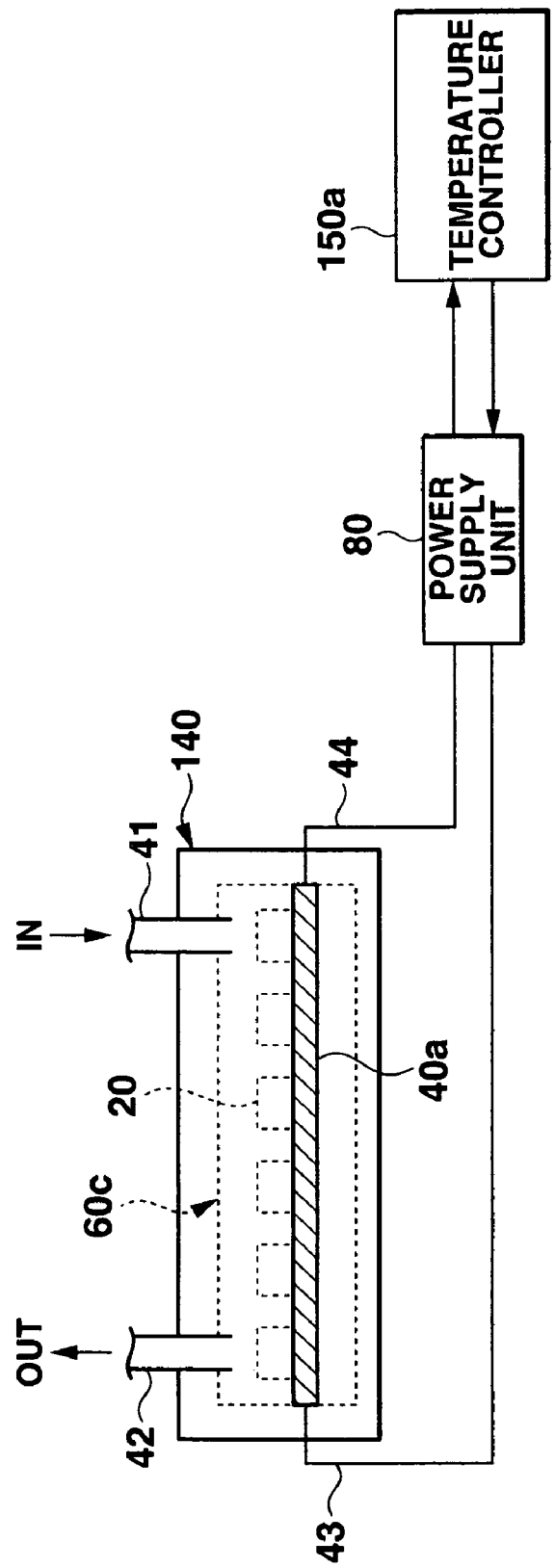
FIG. 9 is a view showing the major components of a temperature control system when the chemical reaction apparatus according to the present invention is applied to a fuel reforming unit of a power generation module of the power supply system.

FIG. 9 is a view showing the main parts of a chemical reaction apparatus temperature control system preferably applicable to the fuel reforming unit 140 of the power generation module 100 in the power supply system 300 described above. This temperature control system is characterized in that a thin-film heater of a chemical reaction apparatus is also used as a temperature sensor. Referring to FIG. 9, a chemical reaction apparatus applied to the reforming unit 140 has the same arrangement as the chemical reaction apparatus 60c according to the third embodiment and is denoted by the same reference numeral. However, it is of course also possible to apply the chemical reaction apparatus 60a or 60b of the first or second embodiment described previously.

As shown in FIG. 9, this temperature control system includes a power supply 80 and temperature controller 150a. Lead lines 43 and 44 connected to a thin-film heater 40a of a chemical reaction apparatus 60c in the reforming unit 140 are connected to terminals of the power supply 80.

The power supply 80 supplies electric power for heat generation to the thin-film heater 40a, and has a function of changing this electric power to be supplied to the thin-film heater 40a in accordance with a control signal from the temperature controller 150a. The power supply 80 also has a function of detecting the values of a voltage and electric current to be applied to the thin-film heater 40a, and detecting the electrical resistance of a heating resistor of the thin-film heater 40a. For example, the voltage to be applied from the power supply 80 to the thin-film heater 40a may be held constant. In this case, the power supply 80 has a function of changing the electric current to be supplied to the thin-film heater 40a, and a function of detecting the electric current flowing in the thin-film heater 40a. Alternatively, the electric current to be supplied from the power supply 80 to the thin-film heater 40a may be held constant. In this case, the power supply 80 has a function of changing the voltage to be applied to the thin-film heater 40a, and a function of detecting the voltage applied to the thin-film heater 40a.

The temperature controller 150a has an arithmetic processing unit such as a general-purpose CPU or a dedicated logic circuit. The temperature controller 150a has at least a function of receiving, from the power supply 80, that electrical resistance of the heating resistor of the thin-film heater 40a, which is detected by the power supply 80, and detecting the temperature of the thin-film heater 40a on the basis of the relationship between the temperature and electrical resistance of the heating resistor, and a function of supplying, to the power supply 80, a control signal for controlling the electric power to be applied from the power supply 80 to the thin-film heater 40a, on the basis of the detected temperature of the thin-film heater 40a. In the above description, the power supply 80 has the function of detecting the electrical resistance of the heating resistor of the thin-film heater 40a. However, the temperature controller 150a may have the same function. In this case, the values of the voltage and electric current to be applied to the thin-film heater 40a are input from the power supply 80 to the temperature controller 150a.

As described above, in controlling the temperature of the chemical reaction apparatus, the conventionally used temperature sensor is made unnecessary, and the thin-film heater is also used as a temperature sensor. This makes it possible to reduce the loss of thermal energy from the chemical reaction apparatus to the outside, and increase the energy utilization.

Those physical properties of the heating resistor forming the thin-film heater, which are suited to the thin-film heater when the thin-film heater is also used as a temperature sensor as described above will be explained below.

As the composition of this heating resistor, it is possible to preferably apply a Ta—Si—O—N-based compound described in each of the above embodiments, or a Ta—Si—O—N—H compound obtained by hydrogenating the Ta—Si—O—N compound.

The electrical resistance of the heating resistor forming the thin-film heater 40a is as follows. Since the thin-film heater 40a is also used as a temperature sensor, if this electrical resistance of the thin-film heater 40a is too small, the resistance of the wiring portion (lead lines 43 and 44) which supply electric power to the thin-film heater 40a causes noise. Therefore, the electrical resistance of the thin-film heater 40a is desirably at least one or two orders of magnitude higher than that of the wiring portion. For example, the thin-film heater 40a preferably has an electrical resistance of 100 Ω or more. When the film thickness of the heating resistor is about 200 Å, the resistivity of the thin-film heater 40a is favorably 2 mΩ·cm or more.

Since the thin-film heater 40a is also used as a temperature sensor, the electrical resistance of the heating resistor forming the thin-film heater 40a desirably has a temperature characteristic exhibiting a relatively large change with respect to a temperature change. As will be described below, the present inventors made extensive studies on this temperature characteristic, and found that if an electrical resistance R(T) when the temperature of the heating resistor of the thin-film heater 40a is T decreases according to a temperature rise with respect to an electrical resistance R(0) when the temperature is 0° C., a material with which a resistance temperature change R(k+100)/R(k) when the temperature rises from k° C. to 100° C. falls within the range of −2% to −7% is desirable, and that if the electrical resistance R(T) when the temperature of the heating resistor is T increases according to a temperature rise with respect to the electrical resistance R(0) when the temperature is 0° C., the resistance temperature change R(k+100)/R(k) of the electrical resistance when the temperature rises from k° C. to 100° C. need only be 3% or more. That is, as the temperature characteristic of the electrical resistance of the heating resistor, the resistance temperature change R(k +100)/R(k) of the electrical resistance when the temperature rises from k° C. to 100° C. need only be −2% to −7% or 3% or more.

Figure 10:
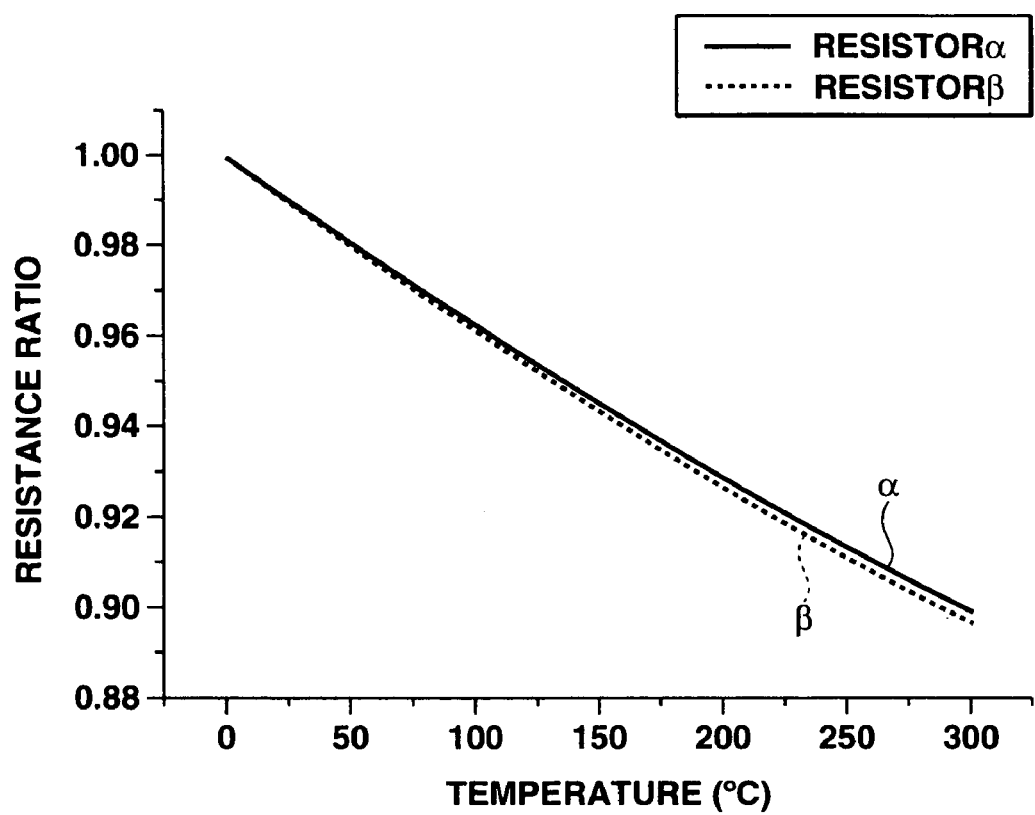
FIG. 10 is a graph showing the relationship between the temperature and electrical resistance of the heating resistor forming the thin-film heater of the chemical reaction apparatus according to the present invention.

FIG. 10 is a graph showing the results of measurement of the relationship between the temperature and electrical resistance of the heating resistor. Two types of samples formed on substrates and having the same composition as the heating resistor described above but different composition ratios were used in the measurement. The composition ratio and resistivity of each sample were as follows.

(Resistor α)

Ta: 21.4%, Si: 20.0%, O: 40.3%, N: 12.0%

Resistivity at room temperature: 2.7 mΩ·cm (Resistor β)

Ta: 28.4%, Si: 22.5%, O: 30.0%, N: 12.0%

Resistivity at room temperature: 4.5 mΩ·cm

The two substrates were heated from 0° C. to 300° C. in a vacuum ambient, and the temperature of each resistor was detected by measuring the thermoelectromotive force with a thermocouple. In addition, the electrical resistance of each resistor was calculated by measuring the applied voltage and applied electric current to the resistor. FIG. 10 plots a value obtained by normalizing the electrical resistance of each resistor by the electrical resistance at 0° C. as a function of temperature.

As shown in FIG. 10, the electrical resistances of both the resistors α and β at T° C. (T>0) reduce from the electrical resistances at 0° C.

Also, when the temperature changes from 0° C. to 300° C., the resistance temperature change R(k+100)/R(k) of the electrical resistance of each of the resistors α and β when the temperature rises from k° C. to 100° C. falls within the range of −2% to −7%.

On the basis of the measurement results, the relationship between the temperature and electrical resistance of the resistor α is approximated by $$R\alpha(T)/R\alpha(0)=1-4.05\times10^{-4}\times T+2.23\times10^{-7}\times T^2 \quad (7)$$

(where Rα (t) is the electrical resistance of the resistor α at t° C.).

Likewise, the relationship between the temperature and electrical resistance of the resistor β is approximated by $$R\beta(T)/R\beta(0)=1-4.14\times10^{-4}\times T+2.23\times10^{-7}\times T^2 \quad (8)$$

(where Rβ (t) is the electrical resistance of the resistor β at t° C.).

The resistivity of a resistor depends upon the amount of cations contained in the material. As the content of O and N as cations increases in a heating resistor containing Ta, Si, O, and N, the resistivity of the resistor increases, and a change in the electrical resistance of the resistor with respect to a temperature change also increases.

The present inventors made extensive studies and found that when the content of O and N with respect to the whole material is larger than approximately 40%, a thin-film heater has an appropriate resistivity and a significant change in electrical resistance with respect to a temperature change, and this allows the thin-film heater to be readily used as a temperature sensor. The present inventors also found that this composition produces almost no difference between the temperature change characteristics of electrical resistances even when there is a slight difference between composition ratios, as indicated by the temperature change characteristics of the electrical resistances of the resistors α and β shown in FIG. 10. That is, when a material having the composition ratio as described above is applied to a heating resistor forming a thin-film heater, the thin-film heater can be used as a good thin-film heater and temperature sensor, and variations in characteristics between fabrication lots can be reduced.

(Power Generation Module, Fuel Pack)

The shapes of the power generation module 100 and fuel pack 210 applied to the power supply system according to the present invention will be briefly explained below with reference to the accompanying drawing.

FIGS. 11A to 11D are schematic views showing the outer shape, viewed from above, from the front, from the side, and from the back, of an example of a fuel pack applied to the power supply system according to the present invention. FIGS. 11E to 11H are schematic views showing the outer shape, viewed from above, from the front, from the side, and from the back, of an example of a holder unit (power generation module) applied to the power supply system according to the present invention.

As shown in FIGS. 11A to 11H, the power supply system according to the embodiment of the present invention includes the fuel pack 210 in which power generation fuel is sealed under predetermined conditions, and the holder unit 220 accommodating the power generation module 100 from which the fuel pack 210 is detachable.

Figure 11A:
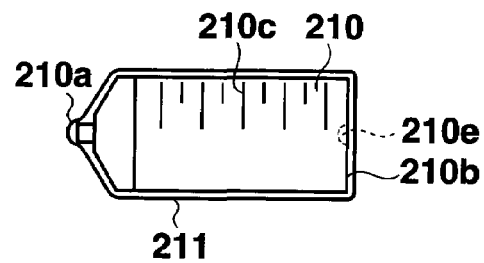
FIGS. 11A to 11D are schematic views showing the outer shape, viewed from above, from the front, from the side, and from the back, of an example of a fuel pack applied to the power supply system according to the present invention.
Figure 11B:
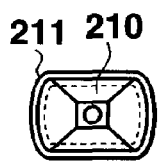
Figure 11C:
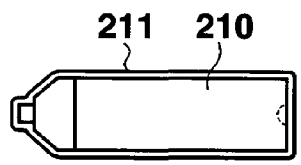
Figure 11D:
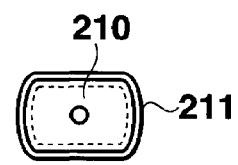

The fuel pack 210 is, e.g., a transparent biodegradable polymer case in which fuel FL is sealed. When the fuel pack 210 is not in use, the case is covered with a package 211 which protects the case against decomposing factors such as bacteria. When the fuel pack 210 is to be attached, the package 211 is peeled. The fuel pack 210 is made of a transparent case and, as shown in FIG. 11A, has an index 210c in an appropriate position on the side surface. With the index 210c, the user can visually check the amount (remaining amount) of power generation fuel remaining in the fuel pack 210.

The holder unit 220 roughly includes a power generating portion 220a which accommodates the power generation module 100 having an arrangement equivalent to that of each embodiment described above and has a positive terminal EL(+), an opposing portion 220b having a negative terminal EL(−), and a connecting portion 220c which connects the power generating portion 220a and opposing portion 220b and electrically connects the power generating portion 220a and negative electrode EL(−). A through space SP1 surrounded by the power generating portion 220a, opposing portion 220b, and connecting portion 220c accommodates the fuel pack 210 when it is connected.

Figure 11E:
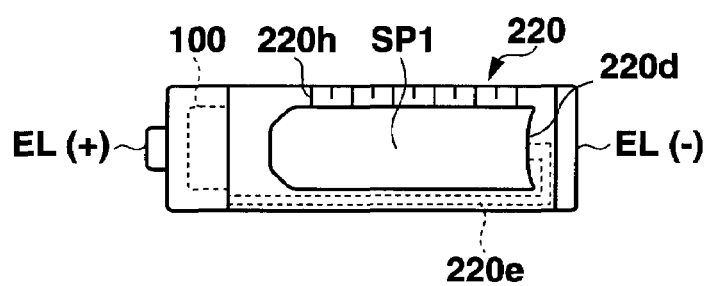
FIGS. 11E to 11H are schematic views showing the outer shape, viewed from above, from the front, from the side, and from the back, of an example of a holder unit applied to the power supply system according to the present invention.
Figure 11F:
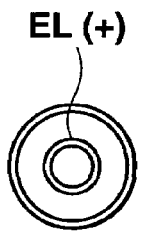
Figure 11G:
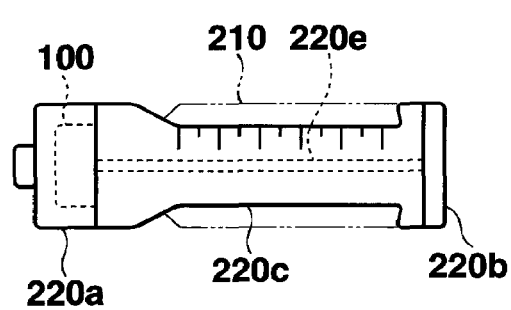
Figure 11H:
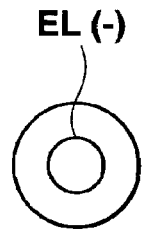

The holder unit 220 also includes a projection 220d and byproduct collecting path 220e. The projection 220d is, e.g., an elastic spring member formed around a portion with which the opposing portion 220b comes in contact, and has a central hole. The byproduct collecting path 220e connects the hole of the projection 220d and a byproduct supply path 104 in the power generation module 100. As shown in FIG. 11E, an index 220h may be engraved on the connecting portion 220c of the holder unit 220, instead of or in addition to the index 210c of the fuel pack 210 shown in FIG. 11A. With the index 220h, the user can easily and accurately check the remaining amount of power generation fuel when the fuel pack 210 is connected to the holder unit 220. The index 220h can be seen more easily when the connecting portion 220c is opaque.

Figure 12:
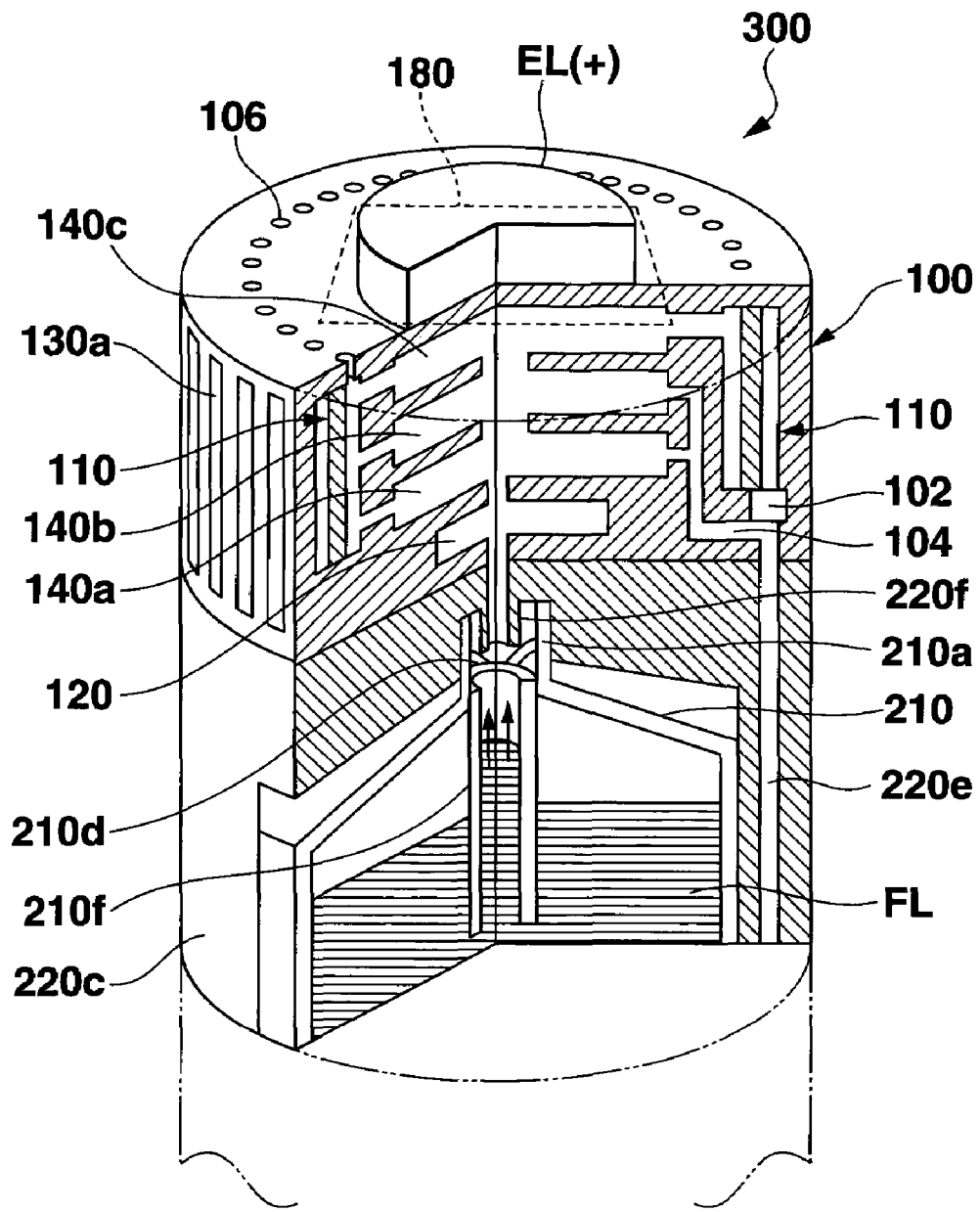
FIG. 12 is a view showing the main components of a practical example of the arrangement of a whole power supply system according to the present invention.
Figure 13A:
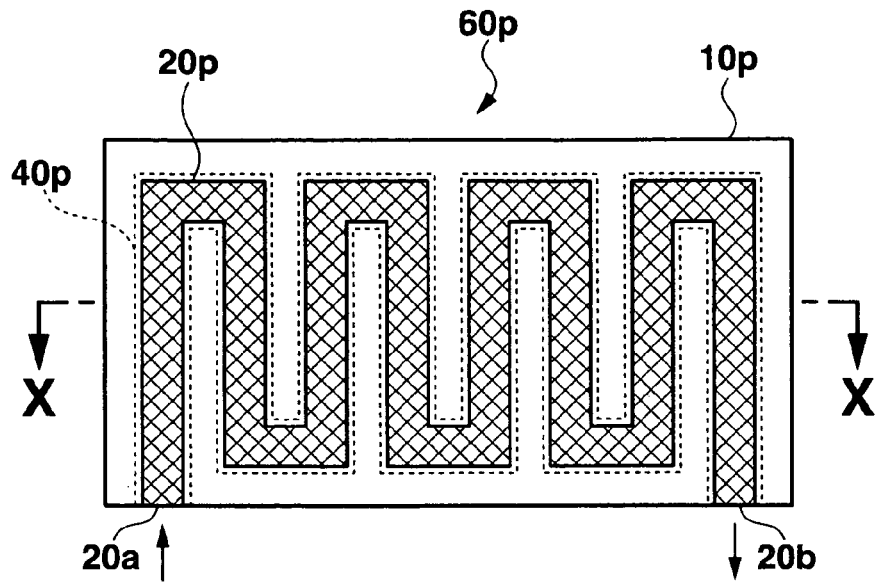
FIGS. 13A, 13B, and 13C are opened-up sectional views of a conventional chemical reaction apparatus.
Figure 13B:
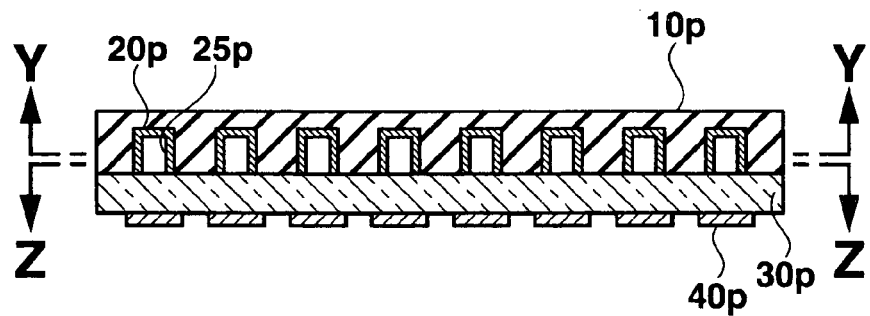
Figure 13C:
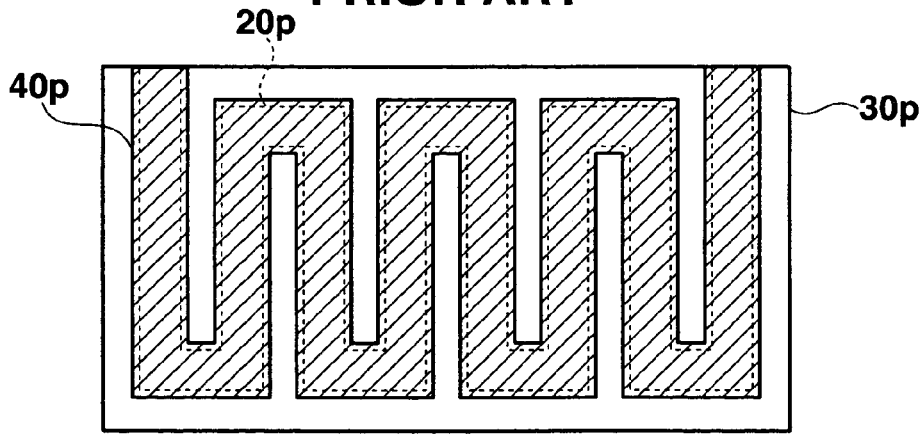
Figure 14A:
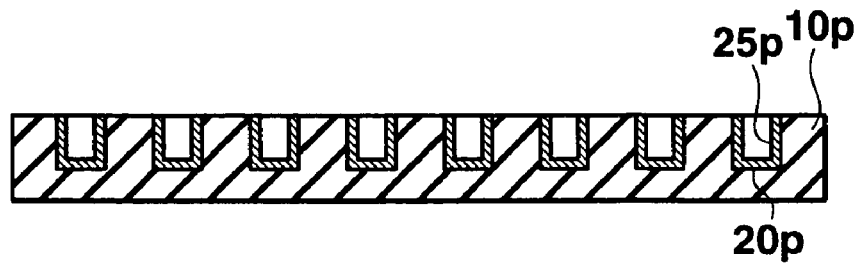
FIGS. 14A, 14B, and 14C are schematic views for explaining the steps of the fabrication process of the conventional chemical reaction apparatus.
Figure 14B:
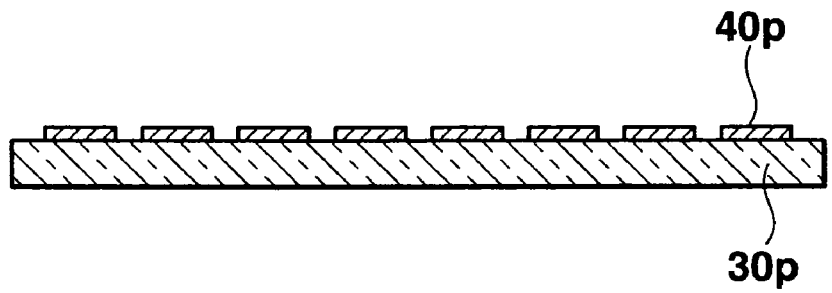
Figure 14C:
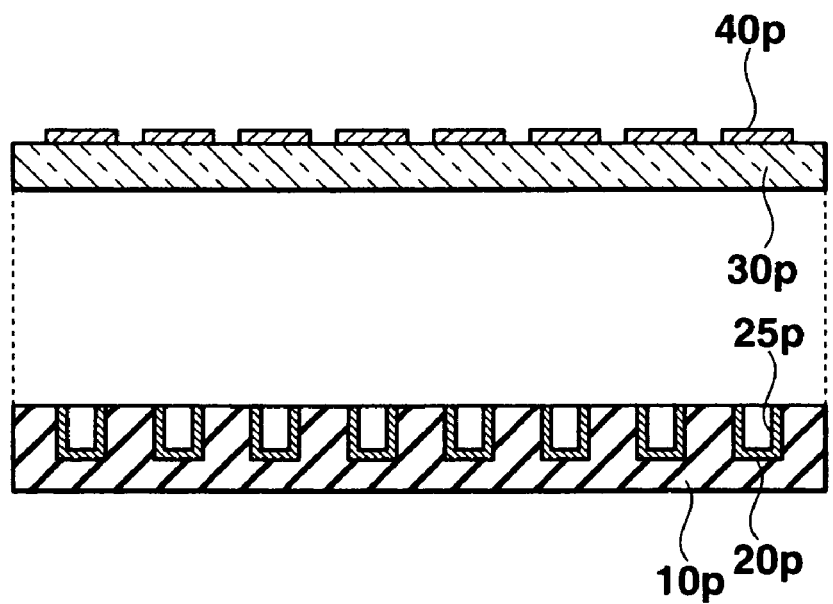
Figure 15:
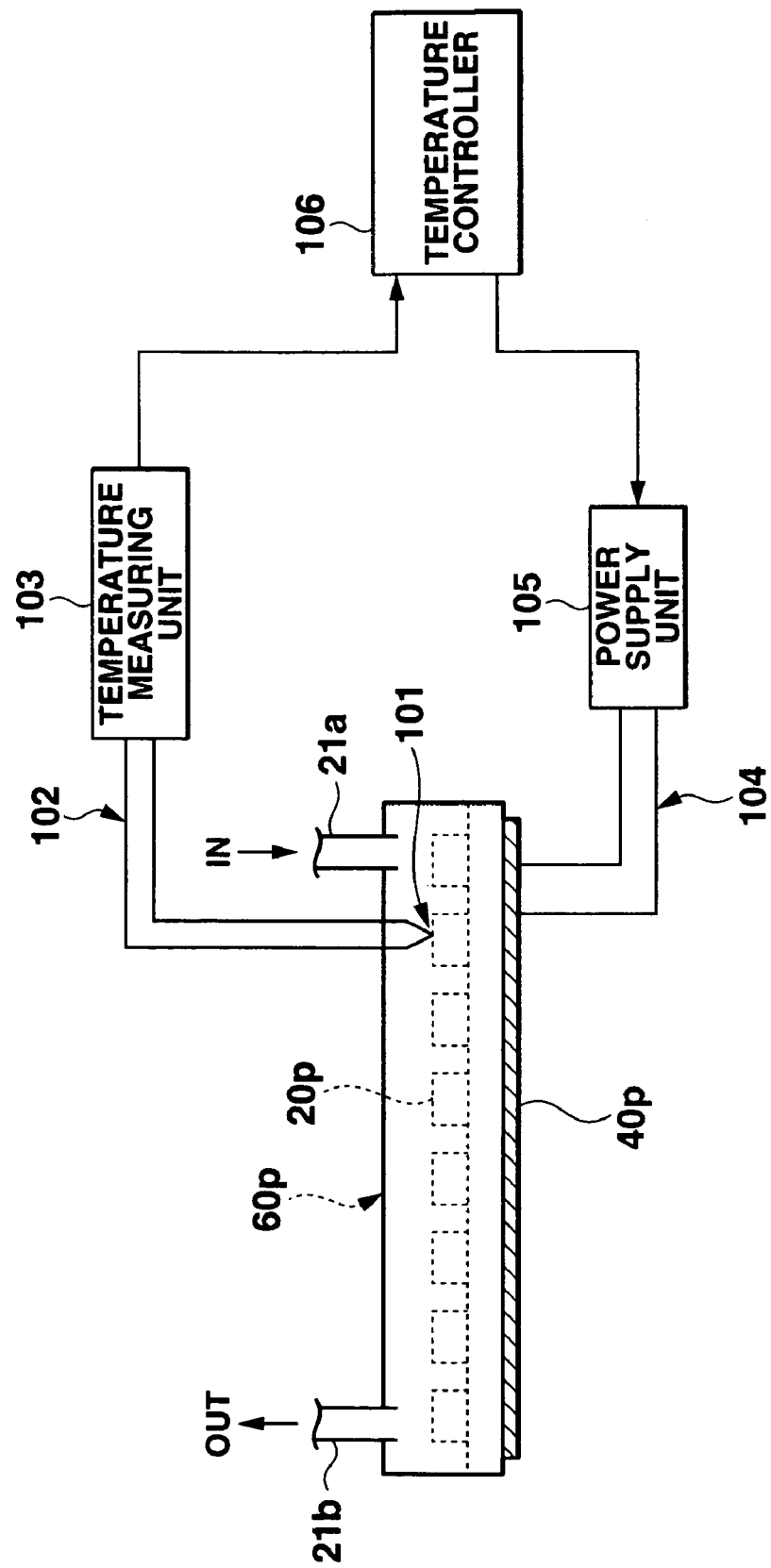
FIG. 15 is a view showing the main parts of an arrangement for temperature control in a heat-treatment apparatus using the conventional chemical reaction apparatus.

In the power supply system having the above arrangement, when the fuel pack 210 from which the package 211 is peeled off is accommodated in the space SP1, as shown in FIG. 12 to be described later, a fuel supply pipe 220f serving as a fuel supply path pushes down a fuel supply valve 210d whose posture is fixed by a spring, thereby releasing a leak preventing function of the fuel pack 210. Consequently, the power generation fuel FL sealed in the fuel pack 210 is supplied to the power generation module 100 automatically by the surface tension in a capillary 210f and the fuel supply pipe 220f, or via a fuel pump (not shown).

The power supply system is so designed as to have an outer shape and outer dimensions substantially equal to those of the columnar, general-purpose chemical cell described above, when the fuel pack 210 is accommodated in the space SP1 and connected to the holder unit 220. To well connect a fuel supply port 210a of the fuel pack 210 to the fuel supply path of the power generating portion 220a with the fuel pack 210 being normally accommodated in the space SP1, the other end 210b of the fuel pack 210 is desirably pressed with an appropriate force. In addition, to prevent unprepared removal of the fuel pack 210 from the holder unit 220, the other end 210b of the fuel pack 210 and the contact portion of the opposing portion 220b are desirably engaged with an appropriate pressing force.

In this way, as described above, operating electric power is supplied from the sub power supply unit 170 to the operation controller 180. Also, when the power supply system according to this embodiment is attached to a predetermined device DVC, the output electric power from the charger 160 or power generator 110 is supplied to the device DVC via the positive terminal EL(+) and the negative terminal EL(−) of the opposing portion 220*b*.

Accordingly, it is possible to realize a perfectly compatible power supply system which can be easily handled similarly to a general-purpose chemical cell, has an outer shape and dimensions (in this embodiment, a columnar shape) identical or equivalent to those of a general-purpose chemical cell, and can supply electric power having electrical characteristics identical or equivalent to those of a general-purpose chemical cell. This allows the power supply system to be applied as operating electric power to devices such as the existing portable devices, in exactly the same manner as a general-purpose chemical cell.

(Practical Example of Arrangement of Power Supply System)

A practical example of the arrangement of the whole power supply system to which any of the above embodiments and arrangements is applied will be described below.

FIG. 12 is a view showing the major components of a practical example of the arrangement of the whole power supply system according to the present invention.

Assume that a sub power supply unit 170 of a power supply module 100 is charged by electric charge stored in a charger 160, and a fuel reforming type fuel cell is applied as a fuel cell of a power generator 110. Also, the same reference numerals as in the embodiments and arrangements described above denote the same parts, and an explanation thereof will be simplified.

As shown in FIG. 12, a power supply system 300 according to this practical arrangement example is so designed that the power generation module 100 and a fuel pack 210 are detachable, and has a columnar outer shape as a whole. These parts (especially the power generation module 100) are formed in a microspace by using the micromachine fabrication technology and the like so as to have outer dimensions equivalent to those of, e.g., a general-purpose chemical cell. However, this outer shape is merely an example and hence does not limit the scope of the invention at all. That is, it is of course possible to use an appropriate shape and size in accordance with the application, necessary capacity, or the like.

The power generation module 100 roughly comprises the power generator 110 extending along the circumferential surface of the columnar shape, a steam reforming reaction unit 140*a* which is formed inside the columnar power generation module 100, and in which a fuel flow path having a depth and width of about, e.g., 500 μm or less and a thin-film heater for setting the internal space of this flow path at a predetermined temperature are formed, a water shift reaction unit 140*b* in which a fuel flow path having a depth and width of about, e.g., 500 μm or less and a thin-film heater for setting the internal space of this flow path at a predetermined temperature are formed, a selective oxidation reaction unit 140*c* in which a fuel flow path having a depth and width of about, e.g., 500 μm or less and a thin-film heater for setting the internal space of this flow path at a predetermined temperature are formed, an operation controller 180 accommodated in the form of a microchip in the power generation module 100, a plurality of ventilation holes (slits) 130*a* extending from the circumferential surface of the columnar power generation module 100 to the air electrode of the power generator 110 to take air from the atmosphere, a separating/collecting unit 102 for separating and collecting a byproduct such as water produced by the air electrode by liquefying the byproduct, a byproduct supply path 220*e* for supplying a portion of the collected byproduct to the steam reforming reaction unit 140*a*, exhaust holes 106 extending from the upper surface of the column to the power generator 110 to exhaust, to outside the power generation module, a byproduct such as carbon dioxide which is produced by the fuel electrode of the power generator, the steam reforming reaction unit 140*a*, the water shift reaction unit 140*b*, and the selective oxidation reaction unit 140*c*, and which is not collected, and the sub power supply unit 170 (not shown).

The chemical reaction apparatus having the arrangement of any of the above embodiments is applied to each of the steam reforming reaction unit 140*a*, water shift reaction unit 140*b*, and selective oxidation reaction unit 140*c*. However, only a region where each reaction unit is formed is shown in FIG. 12. For example, the chemical reaction apparatus may have the arrangement of the third embodiment, and each formation region may be the box member 50. Although these formation regions are separated in FIG. 12, they may also be formed as one formation region in which the individual reaction units are formed as they are stacked.

As water necessary for the reaction, each of the steam reforming reaction unit 140*a* and water shift reaction unit 140*b* uses at least one of water produced by the power generator 110 and supplied via a byproduct supply path 104, and water in fuel FL contained in a fuel pack 210. Carbon dioxide produced by the reaction in each of the steam reforming reaction unit 140*a*, water shift reaction unit 140*b*, and selective oxidation reaction unit 140*c* is exhausted outside the power generation module 100 through the exhaust holes 106.

The fuel pack 210 has a fuel sealed portion 190 in which the power generation fuel FL supplied to the power generator 110 is filled and sealed, a byproduct collecting unit 200 for permanently holding the byproduct (water) collected by the separating/collecting unit 102, a fuel supply valve 210*d* (fuel leak preventing unit) for preventing a leak of the power generation fuel FL, and a byproduct entrapping valve 210*e* (collected product leak preventing unit) for preventing a leak of the collected and held byproduct (collected product). The fuel pack 210 is formed by, e.g., biodegradable plastic.

When the fuel pack 210 having this arrangement is connected to the power generation module 100, a fuel supply pipe 220*f* pushes down the fuel supply valve 210*d* whose posture is fixed by a spring, thereby releasing a leak preventing function of the fuel pack 210. Consequently, the power generation fuel FL sealed in the fuel pack 210 is automatically transported to the power generation module 100 by the surface tension in a capillary 210*f* and the fuel supply pipe 220*f*. Also, when the fuel pack 210 is detached from the power generation module 100, the fuel supply valve 210*d* is closed by the restoring force of the spring, so the power generation fuel FL does not leak.

As described above, when the chemical reaction apparatus according to the present invention is applied to a reforming unit or the like of a power supply system including a fuel reforming type fuel cell, the fabrication cost can be reduced, and high energy utilization and high reliability can be obtained. In addition, since the power supply system can be made compact, the system can have an outer shape and dimensions identical with or equivalent to those of, e.g., a general-purpose chemical cell. Therefore, this power supply system can be used in the same manner as a general-purpose chemical cell, so high convenience can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A chemical reaction apparatus comprising:
    at least one reaction region formed on a solid body and including a continuously formed reaction flow path to which a fluid material is supplied; and
    a temperature adjusting layer which is provided on the solid body and has a planar shape covering an entire formation region of the reaction flow path, and which supplies a predetermined heat quantity to the reaction flow path.

2. An apparatus according to claim 1, wherein the body comprises a plurality of substrates, and at least one substrate of the plurality of substrates in which the reaction flow path is formed is a silicon substrate.

3. An apparatus according to claim 1, wherein the temperature adjusting layer comprises a heating resistor.

4. An apparatus according to claim 3, wherein the heating resistor is a thin-film layer of a compound containing tantalum (Ta), silicon (Si), oxygen (O), and nitrogen (N).

5. An apparatus according to claim 4, wherein a total content of oxygen and nitrogen in the compound is set at not more than 56%.

6. An apparatus according to claim 5, wherein the total content of oxygen and nitrogen in the compound is set at 35% to 56%.

7. An apparatus according to claim 4, wherein a sheet resistance of the thin-film layer is set at 10 to 100 $\Omega/\square$.

8. An apparatus according to claim 4, wherein a resistivity of the compound is set at 0.5 to 10 m$\Omega$·cm.

9. An apparatus according to claim 4, wherein a density of the compound is set at not less than $7.0 \times 10^{22}$/cm$^3$.

10. An apparatus according to claim 3, further comprising:
    a power supply unit which supplies electric power to the heating resistor; and
    a measuring unit which measures an electrical resistance of the heating resistor by measuring at least one of an electric current flowing through the heating resistor and a voltage applied to the heating resistor by the electric power supplied from the power supply unit to the heating resistor.

11. An apparatus according to claim 10, further comprising temperature detecting means for detecting a temperature of the heating resistor on the basis of the electrical resistance of the heating resistor measured by the measuring unit.

12. An apparatus according to claim 11, further comprising control means for controlling the electric power supplied from the power supply unit to the heating resistor on the basis of the temperature of the heating resistor detected by the temperature detecting means.

13. An apparatus according to claim 11, wherein when the temperature of the heating resistor rises 100° C., a change in the electrical resistance of the heating resistor is one of: −2% to −7%, and not less than 3%.

14. An apparatus according to claim 1, wherein the reaction flow path comprises a micron-order, micropatterned flow path.

15. An apparatus according to claim 1, wherein a plurality of reaction regions which cause chemical reactions different from each other are formed on the solid body.

16. An apparatus according to claim 1, wherein the reaction flow path is formed into a trench which is open at one surface of the body, and the temperature adjusting layer is provided to cover the formation region of the reaction flow path and close the open trench of the reaction flow path at said one surface of the body.

17. An apparatus according to claim 16, wherein the body comprises a plurality of substrates, the reaction flow path is formed in one surface of a first substrate of the plurality of substrates, the temperature adjusting layer is formed on one surface of a second substrate of the plurality of substrates, and said one surface of the first substrate and said one surface of the second substrate are opposed and bonded to each other.

18. An apparatus according to claim 1, wherein the body comprises a plurality of substrates, the reaction flow path is formed into a trench in one surface of a first substrate of the plurality of substrates, the temperature adjusting layer is formed in one surface of a second substrate of the plurality of substrates to correspond to the formation region of the reaction flow path, and said one surface of the first substrate and said one surface of the second substrate are opposed and bonded to each other.

19. An apparatus according to claim 1, further comprising a vaporizer which vaporizes the fluid material in the reaction flow path by heating an interior of the reaction flow path by the heat quantity supplied from the temperature adjusting layer.

20. An apparatus according to claim 1, further comprising a catalyst layer including a catalyst which is provided in at least a portion of the reaction flow path.

21. An apparatus according to claim 20, wherein the catalyst is a reforming catalyst, and the chemical reaction apparatus further comprises a reforming unit which produces hydrogen from the fluid material in the reaction flow path by causing a reforming reaction on the fluid material supplied to the reaction flow path by heating an interior of the reaction flow path by the heat quantity supplied from the temperature adjusting layer.

22. An apparatus according to claim 21, wherein the chemical reaction apparatus uses an aqueous solution of methanol as the fluid material.

23. An apparatus according to claim 20, wherein the reaction catalyst is a selective oxidation catalyst, and the chemical reaction apparatus further comprises a converting unit which converts carbon monoxide in the fluid material supplied to the reaction flow path into carbon dioxide and hydrogen in the reaction flow path, by heating an interior of the reaction flow path by the heat quantity supplied from the temperature adjusting layer.

24. An apparatus according to claim 23, wherein the chemical reaction apparatus uses a gas mixture of hydrogen and carbon monoxide as the fluid material.

25. A power supply system comprising:
    a chemical reaction apparatus which comprises:
        at least one reaction region formed on a solid body and including a continuously formed reaction flow path to which a first fluid material is supplied and in which a chemical reaction for converting the first fluid material into a second fluid material is performed;

a temperature adjusting layer which is formed on the solid body and has a planar shape covering an entire formation region of the reaction flow path, and which supplies a heat quantity for performing the chemical reaction to the reaction flow path; and a producing unit which produces hydrogen as the second fluid material by the chemical reaction; and a fuel cell for generating electric power by causing the hydrogen produced by the chemical reaction apparatus to react with oxygen.

26. A system according to claim 25, wherein the body comprises a plurality of substrates, and at least one substrate of the plurality of substrates in which the reaction flow path is formed is a silicon substrate.

27. A system according to claim 25, wherein the temperature adjusting layer of the chemical reaction apparatus comprises a heating resistor.

28. A system according to claim 27, wherein the heating resistor is a thin-film layer of a compound containing tantalum (Ta), silicon (Si), oxygen (O), and nitrogen (N).

29. A system according to claim 28, wherein a total content of oxygen and nitrogen in the compound is set at not more than 56%.

30. A system according to claim 28, wherein a total content of oxygen and nitrogen in the compound is set at 35% to 56%.

31. A system according to claim 28, wherein a sheet resistance of the thin-film layer is set at 10 to 100 10 to 100 $\Omega/\square$.

32. A system according to claim 28, wherein a resistivity of the compound is set at 0.5 to 10 m$\Omega \cdot$cm.

33. A system according to claim 28, wherein a density of the compound is set at not less than $7.0 \times 10^{22}/\text{cm}^3$.

34. A system according to claim 27, wherein the chemical reaction apparatus further comprises:

a power supply unit which supplies electric power to the heating resistor; and a measuring unit which measures an electrical resistance of the heating resistor by measuring at least one of an electric current flowing through the heating resistor and a voltage applied to the heating resistor by the electric power supplied from the power supply unit to the heating resistor.

35. A system according to claim 34, wherein the chemical reaction apparatus further comprises temperature detecting means for detecting a temperature of the heating resistor on the basis of the electrical resistance of the heating resistor measured by the measuring unit.

36. A system according to claim 35, wherein the chemical reaction apparatus further comprises control means for controlling the electric power supplied from the power supply unit to the heating resistor on the basis of the temperature of the heating resistor detected by the temperature detecting means.

37. A system according to claim 35, wherein when the temperature of the heating resistor rises 100° C., a change in the electrical resistance of the heating resistor is one of: −2% to −7%, and not less than 3%.

38. A system according to claim 25, wherein the reaction flow path of the chemical reaction apparatus comprises a micron-order, micropatterned flow path.

39. A system according to claim 25, wherein a plurality of reaction regions which cause chemical reactions different from each other are formed on the solid body in the chemical reaction apparatus.

40. A system according to claim 25, wherein in the chemical reaction apparatus, the reaction flow path is formed into a trench which is open at one surface of the body, and the temperature adjusting layer is formed to cover the formation region of the reaction flow path and close the open trench of the reaction flow path at said one surface of the body.

41. A system according to claim 40, wherein in the chemical reaction apparatus, the body comprises a plurality of substrates, the reaction flow path is formed in one surface of a first substrate of the plurality of substrates, the temperature adjusting layer is formed on one surface of a second substrate of the plurality of substrates, and said one surface of the first substrate and said one surface of the second substrate are opposed and bonded to each other.

42. A system according to claim 25, wherein in the chemical reaction apparatus, the body comprises a plurality of substrates, the reaction flow path is formed into a trench in one surface of a first substrate of the plurality of substrates, the temperature adjusting layer is formed in one surface of a second substrate of the plurality of substrates to correspond to the formation region of the reaction flow path, and said one surface of the first substrate and said one surface of the second substrate are opposed and bonded to each other.

43. A system according to claim 25, wherein the chemical reaction apparatus further comprises a vaporizer which vaporizes the fluid material in the reaction flow path by heating an interior of the reaction flow path by the heat quantity supplied from the temperature adjusting layer.

44. A system according to claim 25, wherein a catalyst layer including a catalyst is formed in at least a portion of the reaction flow path.

45. A system according to claim 44, wherein the catalyst is a reforming catalyst, and the chemical reaction apparatus further comprises a reforming unit which produces hydrogen from the fluid material in the reaction flow path by causing a reforming reaction on the fluid material supplied to the reaction flow path by heating an interior of the reaction flow path by the heat quantity supplied from the temperature adjusting layer.

46. A system according to claim 45, wherein the chemical reaction apparatus uses an aqueous solution of methanol as the fluid material.

47. A system according to claim 44, wherein the reaction catalyst is a selective oxidation catalyst, and the chemical reaction apparatus further comprises a converting unit which converts carbon monoxide in the fluid material supplied to the reaction flow path into carbon dioxide and hydrogen in the reaction flow path, by heating an interior of the reaction flow path by the heat quantity supplied from the temperature adjusting layer.

48. A system according to claim 47, wherein the chemical reaction apparatus uses a gas mixture of hydrogen and carbon monoxide as the fluid material.

* * * * *